(12) United States Patent
Omasa

(10) Patent No.: US 7,459,071 B2
(45) Date of Patent: *Dec. 2, 2008

(54) HYDROGEN-OXYGEN GAS GENERATOR AND METHOD OF GENERATING HYDROGEN-OXYGEN GAS USING THE GENERATOR

(75) Inventor: Ryushin Omasa, Fujisawa (JP)

(73) Assignee: Japan Techno Co., Ltd., Tokyo (JP)

( * ) Notice: Subject to any disclaimer, the term of this patent is extended or adjusted under 35 U.S.C. 154(b) by 389 days.

This patent is subject to a terminal disclaimer.

(21) Appl. No.: 10/476,195

(22) PCT Filed: May 2, 2002

(86) PCT No.: PCT/JP02/04400

§ 371 (c)(1),
(2), (4) Date: Oct. 28, 2003

(87) PCT Pub. No.: WO02/090621

PCT Pub. Date: Nov. 14, 2002

(65) Prior Publication Data

US 2004/0094408 A1      May 20, 2004

(30) Foreign Application Priority Data

May 2, 2001 (JP) ............................ 2001-135627

(51) Int. Cl.
C25B 1/02 (2006.01)
C25B 1/16 (2006.01)
C25B 1/20 (2006.01)
C25C 7/00 (2006.01)
C25B 9/20 (2006.01)

(52) U.S. Cl. ................ 205/628; 205/633; 205/637; 205/755; 204/242; 204/273; 204/275.1; 204/278; 204/278.5; 366/116; 366/243; 366/276

(58) Field of Classification Search ............... 204/273, 204/242, 275.1, 278, 278.5; 205/628–639, 205/755; 366/116, 243, 276
See application file for complete search history.

(56) References Cited

U.S. PATENT DOCUMENTS 2,744,860 A * 5/1956 Rines .................... 205/137

(Continued)

FOREIGN PATENT DOCUMENTS

JP 51-105979 12/1975

(Continued)

Primary Examiner—Roy King
Assistant Examiner—Lois L Zheng
(74) Attorney, Agent, or Firm—Frommer Lawrence & Haug LLP; Ronald R. Santucci

(57) ABSTRACT

A hydrogen-oxygen gas generator comprising an electrolytic cell, an electrode group formed from an anode and a cathode mutually installed in that electrolytic cell, a power supply for applying a voltage across the anode and cathode, a gas trapping means for collecting the hydrogen-oxygen gas generated by electrolyzing the electrolyte fluid and a vibration-stirring means. The gas trapping means is comprised of a lid member installed on the electrolytic cell, a hydrogen-gas extraction tube connecting to the hydrogen-oxygen gas extraction outlet of that lid member. A vibration-stirring means for stirring and agitating the electrolytic fluid is supported by support tables. The distance between the adjacent positive electrode and negative electrode within the electrode group is set within a range of 1 to 20 millimeters. The vibration-stirring means is comprised of vibrating motors vibrating at 10 to 200 Hertz, and vibrating blades vibrating within the electrolytic cell and unable to rotate are attached to a vibrating rod linked to the vibrating motors.

5 Claims, 21 Drawing Sheets

U.S. PATENT DOCUMENTS

| | | | |
|---|---|---|---|
| 3,941,676 A | | 3/1976 | Macken |
| 4,042,481 A | * | 8/1977 | Kelly .......................... 204/270 |
| 4,470,894 A | * | 9/1984 | Dyer .......................... 205/342 |
| 5,105,773 A | * | 4/1992 | Cunningham et al. .......... 123/3 |
| 5,244,558 A | * | 9/1993 | Chiang ....................... 204/241 |
| 5,730,856 A | * | 3/1998 | Omasa ....................... 205/742 |
| 6,123,815 A | * | 9/2000 | Omasa ....................... 204/222 |
| 6,126,794 A | * | 10/2000 | Chambers ................ 204/230.5 |

FOREIGN PATENT DOCUMENTS

| | | |
|---|---|---|
| JP | 3-275130 A | 12/1991 |
| JP | 6-220697 A | 8/1994 |
| JP | 6-280035 A | 10/1994 |
| JP | 6-287799 A | 10/1994 |
| JP | 6-304461 A | 11/1994 |
| JP | 6-312124 A | 11/1994 |
| JP | 6-330395 A | 11/1994 |
| JP | 7-54192 | 2/1995 |
| JP | 7-126896 A | 5/1995 |
| JP | 8-173785 A | 7/1996 |
| JP | 8-281272 A | 10/1996 |
| JP | 9-40482 A | 2/1997 |
| JP | 3037633 | 5/1997 |
| JP | 10-43569 A | 2/1998 |
| JP | 11-189880 A | 7/1999 |
| JP | 11-253782 A | 9/1999 |
| JP | 2000-104192 A | 4/2000 |
| JP | 2000-129480 A | 5/2000 |
| JP | 2001-295087 A | 10/2001 |
| JP | 2002-282669 A | 10/2002 |

* cited by examiner

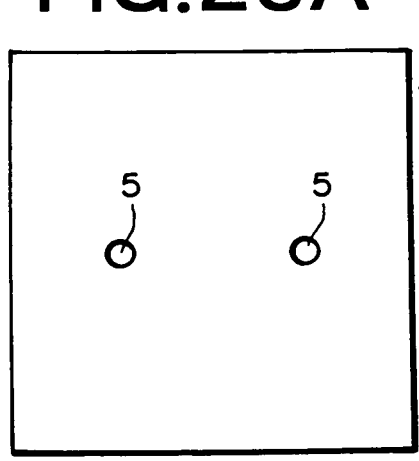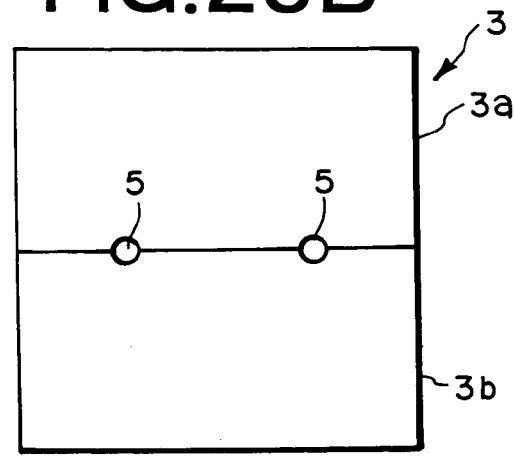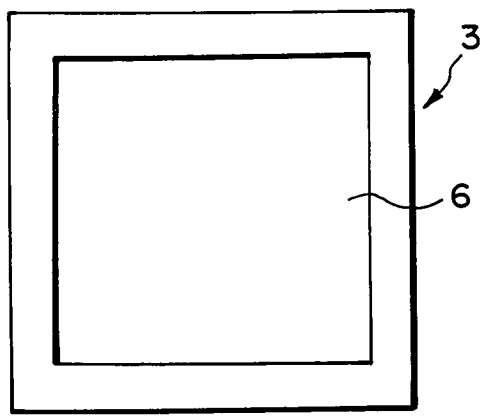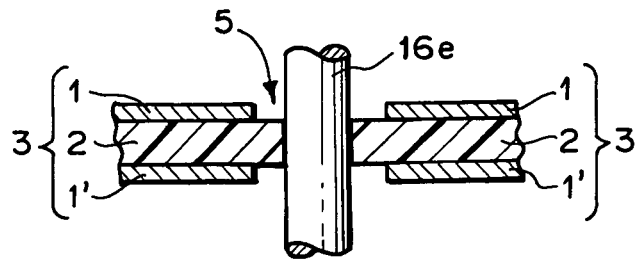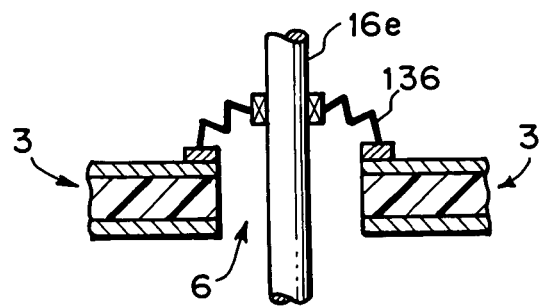

HYDROGEN-OXYGEN GAS GENERATOR AND METHOD OF GENERATING HYDROGEN-OXYGEN GAS USING THE GENERATOR

This application is a 371 of PCT/JP02/04400 filed on May 2, 2002, published on Nov. 14, 2002 under publication number WO 02/090621 A1 and claims priority benefits of Japanese Patent Application No. 2001-135627 filed May 2, 2001.

BACKGROUND OF THE INVENTION

1. Field of the Invention

The present invention relates to an apparatus and method for generating hydrogen-oxygen gas, and relates in particular to a hydrogen-oxygen gas generator and hydrogen-oxygen gas generating method for highly efficient generation of hydrogen-oxygen gas.

2. Description of Related Art

Electrolysis or electrolytic technology was pioneered by Faraday. The electrolysis of water is known to produce a hydrogen-oxygen gas in a ratio of two parts hydrogen to one part oxygen. Research on hydrogen-oxygen gas has continued up to the present time. One example of a practical technology is a gas generating apparatus developed by Dr. Yull Brown of Brown Energy System Technology PTY. LTD. of Australia. Patent document relating to this technology is disclosed in Japanese Utility Model Registration 3037633.

In this technology, the structure of the electrolytic cell for generating the hydrogen-oxygen gas is comprised of multiple electrode plates formed with mutually perpendicular electrolytic fluid flow holes and gas flow holes at the top and bottom in the center, and formed with bolt holes on four sides; multiple alternately coupled spacers formed with bolt housing holes protruding outwards between the electrode plates, and O-rings inserted on the spacer inner circumferential surface for sealing of the filled electrolytic fluid; and electrolytic cell cover plates holding electrical current conducting bolts and gas coupling nipples and electrolytic fluid coupling nipples are mounted on both sides of the electrode plates, and an electrode plate tightened by nuts to a stay bolt enclosed by bolt holes of the electrolytic cell cover plates and spacer bolt housing holes, electrode plate bolt holes, with the spacer and electrolytic cell cover plates mutually joined together.

However, in the method of the related art, the shortest possible distance between the adjacent electrode plates within this kind of electrolytic cell was a gap of 50 millimeters just sufficient to prevent electrical shorts. An even shorter distance between electrode plates tended to cause accidents due to excessive current flow. The efficiency of the apparatus and method of the related art was therefore limited when producing hydrogen-oxygen gas by increasing the electrical current density. The related art therefore had the problem that adequate efficiency could not be provided.

On the other hand, since the size of each electrolytic cell was limited, the amount of hydrogen-oxygen gas produced by one hydrogen-oxygen gas generator was also limited. In view of practical needs, preferably a device with as small a size as possible, preferably produces as much hydrogen-oxygen gas as possible per unit of time. However, the apparatus of the related art could not satisfy the dual needs of both a compact size and generation of larger amounts of hydrogen-oxygen gas.

In view of the problems with the related art, the present invention provides increased amounts of hydrogen-oxygen gas per electrode unit surface area per unit of time by improving electrolyzing conditions and boosting hydrogen-oxygen gas generating efficiency, to enable production of larger hydrogen-oxygen gas quantities from each generator apparatus and a more compact apparatus.

SUMMARY OF THE INVENTION

To achieve the objects of the invention the present invention provides a hydrogen-oxygen gas generator comprising an electrolytic cell, an electrode group formed from a first electrode and a second electrode mutually installed in that electrolytic cell, a power supply for applying a voltage across the first electrode and a second electrode, a gas trapping means for collecting the hydrogen-oxygen gas generated by electrolyzing the electrolyte fluid stored within the electrolytic cell, wherein said generator further contains a vibration-stirring means for stirring and agitating the electrolytic fluid stored within the electrolytic cell, and the distance between the adjacent first electrode and a second electrode adjacently installed within the electrode group is set within a range of 1 to 20 millimeters, preferably 6 to 20 millimeters.

In a first aspect of the invention, a gas trapping means is comprised of a lid member installed on the electrolytic cell, and a hydrogen-oxygen gas extraction tube connecting to the hydrogen-oxygen gas extraction outlet formed on that lid member.

In a first aspect of the invention, the vibration-stirring means is comprised of a vibration generating means containing vibrating motors, a vibrating rod is linked to the vibration generating means for vibrating within the electrolytic cell, and vibrating blades unable to rotate, are installed on at least one level of the vibrating rod, and the vibrating motors vibrate at 10 to 200 Hertz. In the first aspect of the invention, the vibration generating means is installed with a vibration absorbing material on the upper side of the electrolytic cell. In the first aspect of the invention, the vibration generating means is supported by support tables separate from the electrolytic cell. In the first aspect of the invention, the gas trapping means is comprised of a lid member installed on the electrolytic cell, and a hydrogen-oxygen gas extraction tube connecting to the hydrogen-oxygen gas extraction outlet formed on that lid member, and the vibrating rod extends through the lid member, and a sealing means between the lid member and the vibrating rod allows vibration of the vibrating rod and also prevents the passage of hydrogen-oxygen gas.

In the first aspect of the invention, at least one of either the first electrode or the second electrode contain multiple holes. In the first aspect of the invention, the power source is a direct current pulse power source.

To achieve the objects of the invention the present invention provides a hydrogen-oxygen gas generating method wherein said method utilizes a hydrogen-oxygen gas generator as described above, and utilizes electrolyte fluid consisting of 5 to 10 percent weight by volume of electrolytic material at pH7 to 10 at 20 to 70 degrees centigrade, to perform electrolysis of the electrolyte fluid to reach an electrical current density of 5 A/dm$^2$ to 20 A/dm$^2$.

In the first aspect of the invention, the electrolysis is performed in an electrolytic cell sealed by a lid member. In the first aspect of the invention,, the electrolytic material is a water-soluble alkali metal hydroxide or an alkali rare-earth metal hydroxide. In the first aspect of the invention, the power source is a direct current pulse power source.

In the first aspect of the invention, the vibrating blades of the vibration-stirring means cause a powerful vibrating flow movement in the electrolytic fluid so that the electrolytic fluid can make contact with the electrodes with ample, satisfactory uniformity and also an adequate supply quantity. Therefore even if the gap between the anode and the cathode is drastically reduced to a distance even smaller than in the related art, ions can still be supplied in an adequate quantity required for electrolysis, and the electrolytic heat generated in the electrodes can be quickly dissipated. Electrolysis can therefore be performed at a high electrical current density so that hydrogen-oxygen gas can be collected with high efficiency. Further, by reducing the distance between the cathode and anode as described above, the effective surface area of the electrodes can be sufficiently increased per volumetric unit so that ample quantities of hydrogen-oxygen gas can be generated even if the electrolytic cells are made more compact.

In particular, when performing electrolysis by vibrating and agitating the electrolyte fluid using the vibration-stirring means, the hydrogen and oxygen generated in the vicinity of the electrodes is carried to the electrolyte fluid surface and transitions to a gaseous state before forming gas bubbles. Therefore, there is no problem with the hydrogen and oxygen generated in the electrolyte fluid adhering to the surface of the electrodes and increasing the electrical resistance. Therefore electrolysis with a high electrical current density as described above can easily be acheived.

BRIEF DESCRIPTION OF THE DRAWINGS

FIG. 23A through FIG. 23C are flat views of the laminated piece;

FIG. 24A and FIG. 24B are cross sectional views showing the state of the sealed electrolytic cell by the laminated piece;

DETAILED DESCRIPTION OF THE PREFERRED EMBODIMENTS

Figure 1:
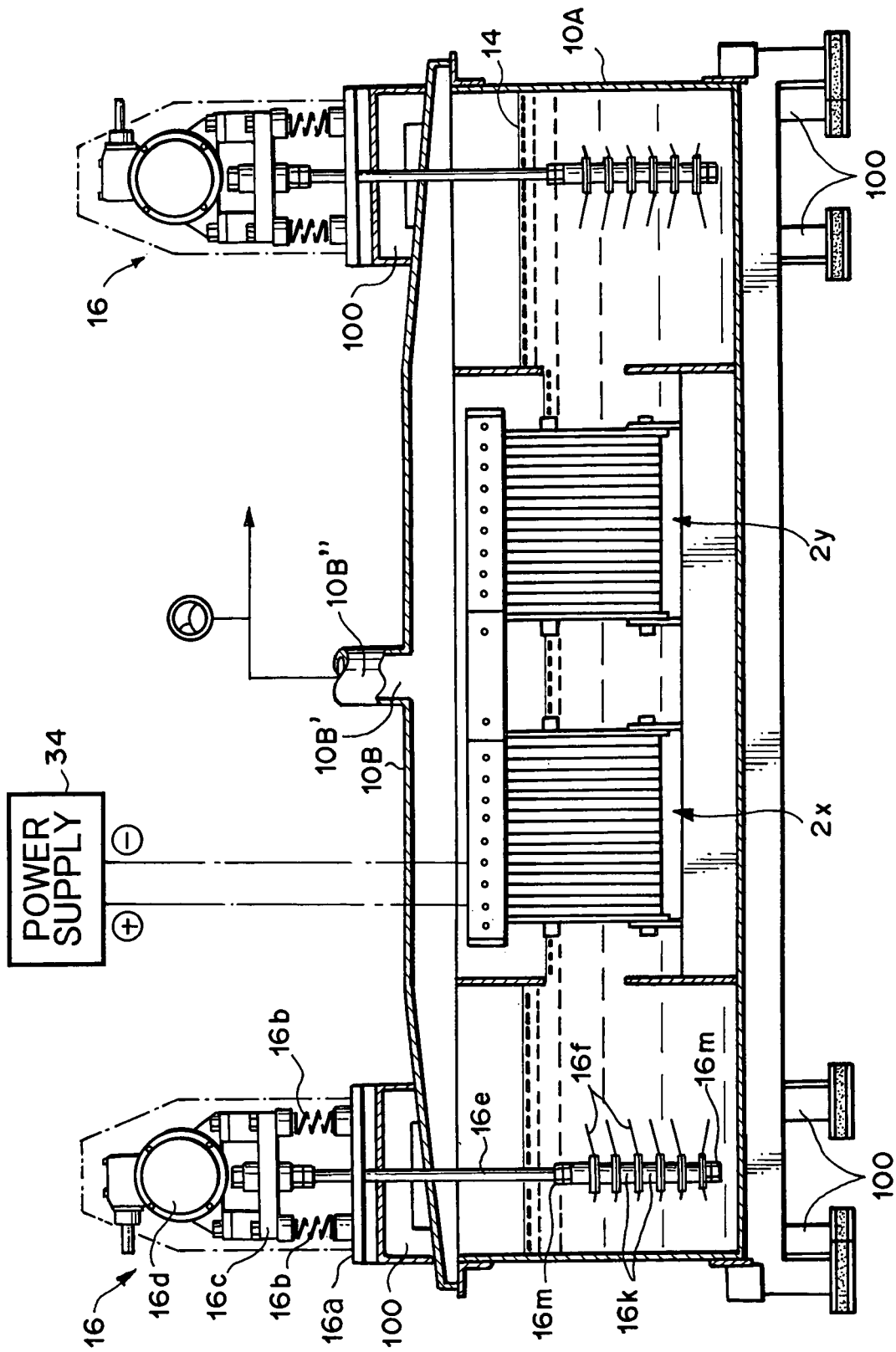
FIG. 1 is a cross sectional drawing showing the hydrogen-oxygen gas generator of the present invention.

The preferred embodiments of the present invention are described next while referring to the drawings. In the drawings, members or sections having identical functions are assigned the same reference numerals.

Figure 2:
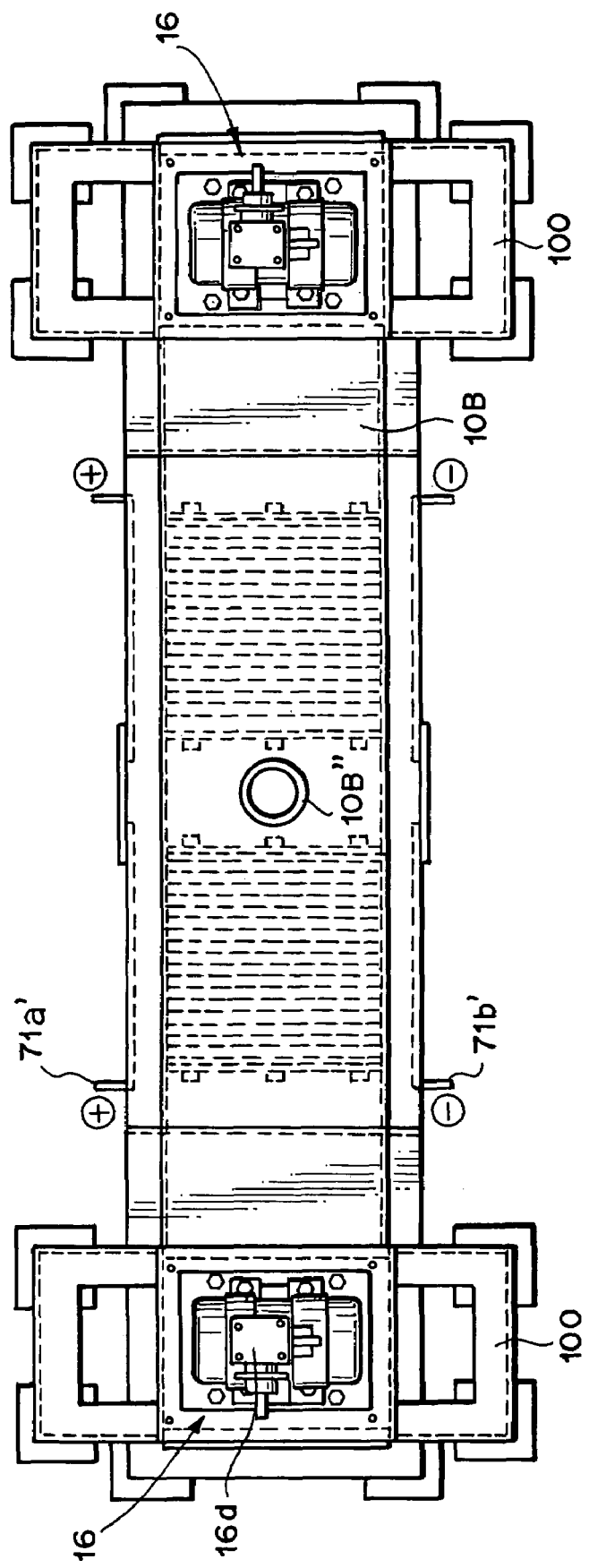
FIG. 2 is a flat view of the hydrogen-oxygen gas generator of FIG. 1.
Figure 3:
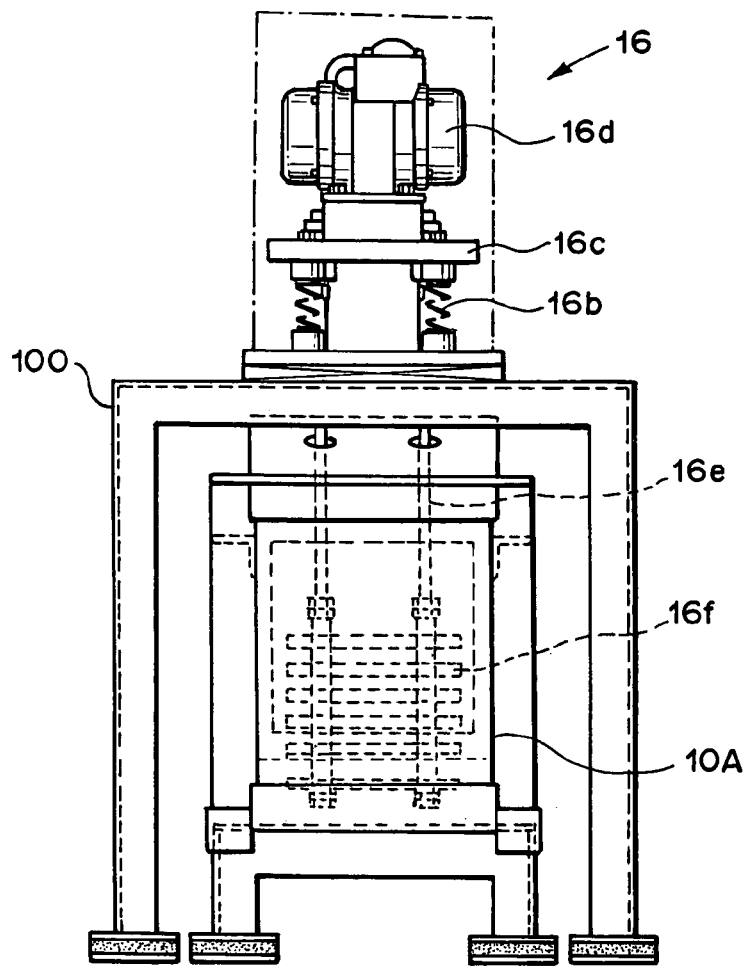
FIG. 3 is a side view of the apparatus of FIG. 1.

FIG. 1 through FIG. 3 are drawings showing the structure of the embodiment of the hydrogen-oxygen gas generator for implementing the hydrogen-oxygen gas generating method of the present invention. Of these figures, FIG. 1 is a cross sectional view, FIG. 2 is a flat view, and FIG. 3 is a side view.

In these figures, reference numeral 10A denotes the electrolytic cell. The electrolytic cell contains electrolytic fluid 14. Reference numeral 16 is the vibration-stirring means. The vibration-stirring means 16 is comprised of a base 16a installed via anti-vibration rubber onto a support bed 100 separate from the electrolytic cell 10a, a coil spring 16b as a vibration absorbing material installed with the bottom edge clamped to the base (16a), a vibration member 16c clamped to the top edge of that coil spring, vibration motor 16d installed on that vibration member, a vibrating rod (vibration transmission rod) 16e installed on the top edge of the vibration member 16c, and a vibrating blade 16f unable to rotate, and installed at multiple levels at a position immersed in the electrolytic fluid 14 at the lower half of the vibrating rod 16. A vibration generating means contains a vibration motor 16d and a vibration member 16c. That vibration generating means is linked to the vibrating rod 16e. A rod-shaped guide member can be installed within the coil spring 16b as described later on in FIG. 16 and elsewhere.

The vibration motors 16d vibrate at 10 to 200 Hertz under control for example of an inverter and preferably vibrate at 20 to 60 Hertz. The vibration generated by the vibration motors 16d is transmitted to the vibrating blade 16f by way of the vibrating member 16c and the vibrating rod 16e. The tips of the vibrating blades 16f vibrate at the required frequency inside the electrolytic fluid 14. The vibrating blades 16f generate a "rippling" oscillation to the tips, from the section where installed onto the vibrating rod 16e. The amplitude and frequency of this vibration are different from that of the vibrating motors 16d, and are determined by the mechanical characteristics of the vibration transmission path and the mutual interaction with the electrolytic fluid 14. In the present invention, the amplitude is preferably 0.1 to 15.0 millimeters and the frequency is 200 to 1,000 times per minute.

Figure 7:
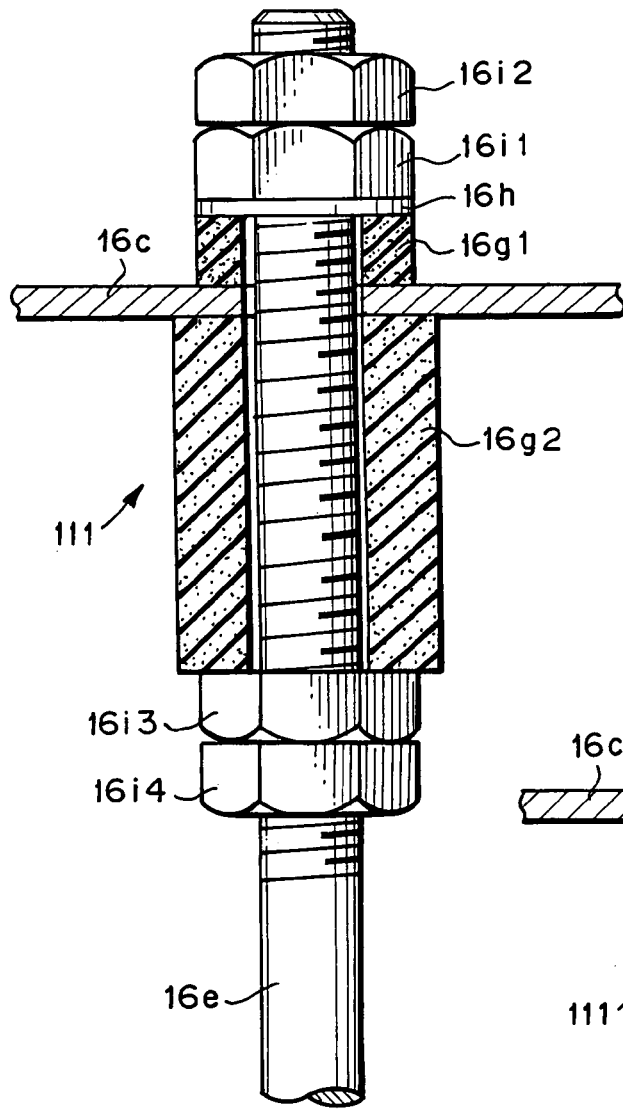
FIG. 7 is an enlarged cross sectional view showing the attachment of the vibrating rod onto the vibrating member of the apparatus of FIG. 1.

FIG. 7 is an enlarged cross sectional view showing the installation of the vibrating rod 16e attachment piece 111 onto the vibrating member 16c. The nuts 16i1, 16i2 are fit from the top side of vibration member 16c, by way of the vibration strain dispersion member 16g1 and washer 16h, onto the male screw section formed at the top end of vibrating rod 16e. The nuts 16i3, 16i4 are fit by way of the vibration strain dispersion member 16g2 from the bottom side (onto the screw section) of the vibration member 16c. The vibration strain dispersion member 16g1, 16g2 are utilized as a vibration stress dispersion means made for example from rubber. The vibration strain dispersion member 16g1, 16g2 can be made from a hard resilient piece for example of natural rubber, hard synthetic rubber, or plastic with a Shore A hardness of 80 to 120 and preferably 90 to 100. Hard urethane rubber with a Shore A hardness of 90 to 100 is particularly preferably in view of its durability and resistance to chemicals. Utilizing the vibration stress dispersion means prevents vibration stress from concentrating on the near side of the junction of vibrating member c and the vibrating rode 16e, and makes the vibrating rod 16e more difficult to break. Raising the vibration frequency of the vibrating motors 16d to 100 Hertz or higher is particularly effective in preventing breakage of the vibrating rod 16e.

Figure 8:
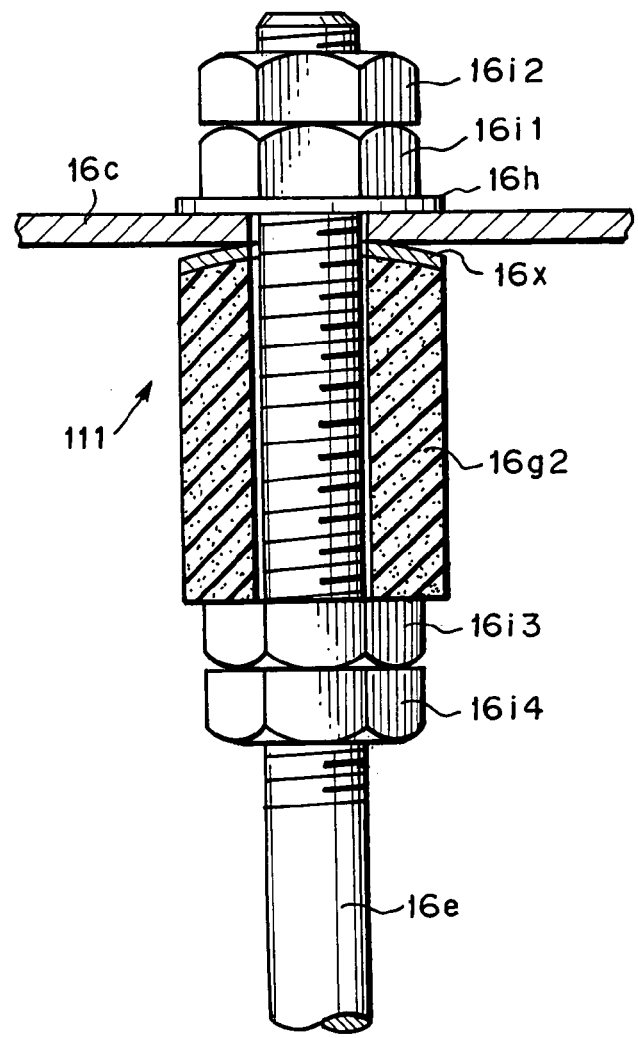
FIG. 8 is an enlarged cross sectional view showing a variation of the attachment of the vibrating rod onto the vibrating member.

FIG. 8 is an enlarged cross sectional view showing a variation of the vibrating rod 16e attachment piece 111 onto the vibrating member 16c. This variation differs from the attachment piece of FIG. 7, only in that the vibration strain dispersion member 16g1 is not installed on the top side of the vibration member 16c and in that there is a spherical spacer 16x between the vibration member 16c and the vibration strain dispersion member 16g. In all other respects the variation is identical to FIG. 7.

Figure 9:
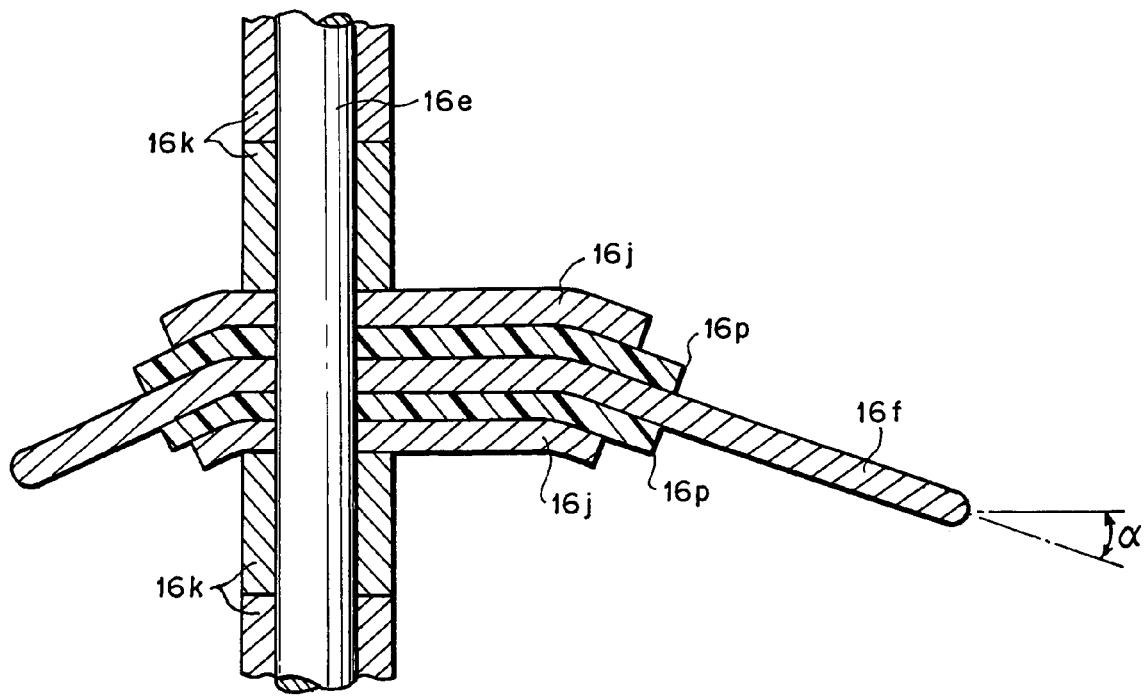
FIG. 9 is an enlarged cross sectional view of the vibrating blade attachment onto the vibrating rod of the apparatus of FIG. 1.
Figure 10:
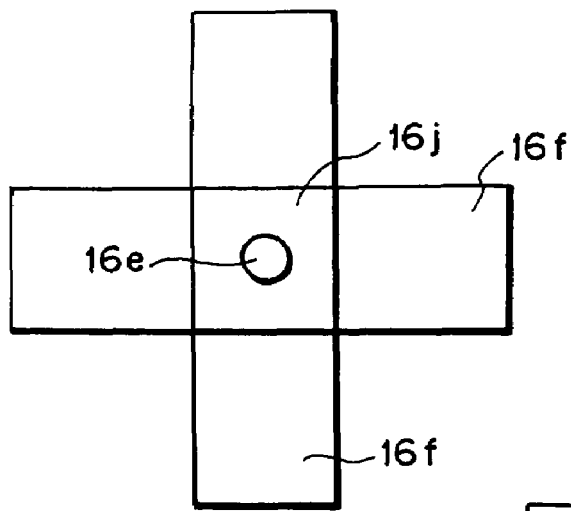
FIG. 10 is a flat view showing a variation of the vibrating blade and the clamping member.
Figure 11:
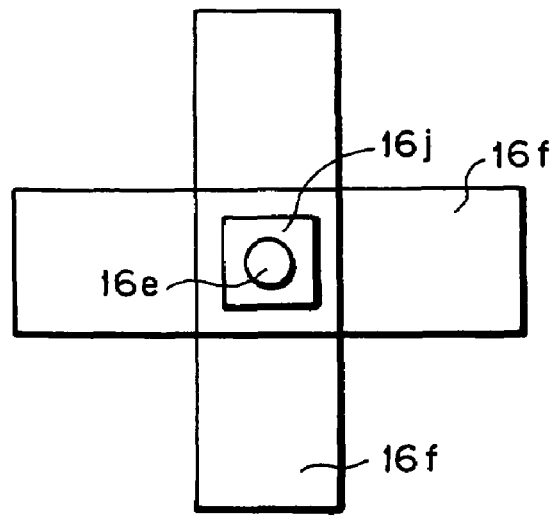
FIG. 11 is a flat view showing a variation of the vibrating blade and the clamping member.
Figure 12:
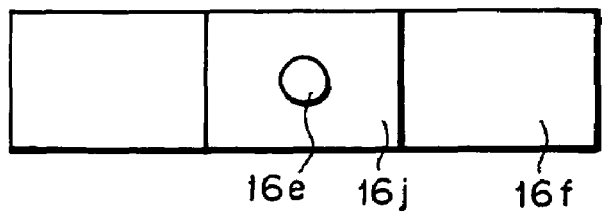
FIG. 12 is a flat view showing a variation of the vibrating blade and the clamping member.
Figure 13:
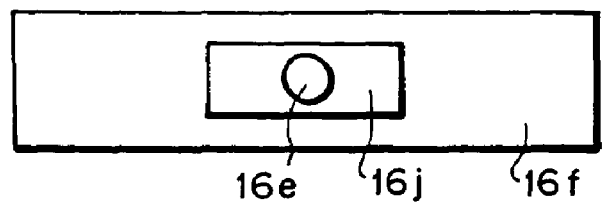
FIG. 13 is a flat view showing a variation of the vibrating blade and the clamping member.

FIG. 9 is an enlarged cross sectional view of the vibrating blade 16f attachment onto the vibrating rod 16e. A vibrating blade clamp member 16j is installed on both the top and bottom sides of each vibrating blade 16f. Spacer rings 16k are installed for setting the spacing between the vibrating blades 16f by means of clamp members 16j. A nut 16m is screwed on to the vibrating rod 16e formed as a male screw with or without spacer rings 16k as shown in FIG. 1, on the upper side of the topmost section of vibrating blade 16f, and the lower side of the bottom-most section of the vibrating blade 16f. As shown in FIG. 9, the breakage of the vibrating blade 16f can be prevented by installing a resilient member sheet 16p as the vibration dispersion means made from fluorine plastic or fluorine rubber between each vibrating blade 16f and clamping member 16j. The resilient member sheet 16p is preferably installed to protrude outwards somewhat from the clamping member 16j in order to further enhance the breakage prevention effect of the vibrating blade 16f. As shown in the figure, the lower surface (press-contact surface) of the upper side of clamping member 16j is formed with a protruding surface, and the upper surface (press contact surface) of the lower side clamping member 16j is formed with a recessed surface. The section of the vibrating blade 16f compressed from above and below by the clamping member 16j is in this way forced in a curved shape, and the tip of the vibrating blade 16f forms an angle α versus the horizontal surface. This α angle can be set to −30 degrees or more and 30 degrees or less, and preferably is −20 degrees or more and 20 degrees or less. The α angle in particular is −30 degrees or more and −5 degrees or less, or is 5 degrees or more and 30 degrees or less, and preferably is −20 degrees or more and −10 degrees or less, or is 10 degrees or more and 20 degrees or less. The α angle is 0 if the clamping member 16j (press contact) surface is flat. The α angle need not be the same for all the vibrating blades 16f. For example, the lower 1 to 2 blades of vibrating blade 16f may be set to a minus value (in other words, facing downwards: facing as shown in FIG. 9) and all other blades of vibrating blade 16f set to a plus value (in other words facing upwards: the reverse of the value shown in FIG. 9).

FIG. 10 through FIG. 13 are flat views showing variations of the vibrating blade 16f and the clamping member 16j. In the variations in FIG. 10 and FIG. 11, the vibrating blade 16f may be comprised of two short overlapping strips crossing each other and, or may cut out in a cross shape from one sheet as shown in the drawing.

Resilient metal plate, plastic plate or rubber plate may be utilized as the vibrating blade 16f. A satisfactory thickness range for the vibrating blade 16f differs according to the vibration conditions and viscosity of the electrolytic fluid 14. However, during operation of the vibration-stirring means 16, the vibrating blades should be set so the tips of the vibrating blades 16f provide an oscillation (flutter phenomenon) for increasing the stirring (or agitating) efficiency, without breaking the vibrating blade. If the vibrating blade 16f is made from metal plate such as stainless steel plate, then the thickness can be set from 0.2 to 2 millimeters. If the vibrating blade 16f is made from plastic plate or rubber plate then the thickness can be set from 0.5 to 10 millimeters. The vibrating blade 16f and clamping member 16j can be integrated into one piece. Integrating them into one piece avoids the problem of having to wash away electrolytic fluid 14 that penetrates into the junction of the vibrating blade 16f and clamp member 16j and hardens and adheres there.

The material for the metallic vibrating blade 16f may be titanium, aluminum, copper, steel, stainless steel, a ferromagnetic metal such as ferromagnetic steel, or an alloy of these metals. The material for the plastic vibrating blade 16f may be polycarbonate, vinyl chloride resin, polyprophylene.

Figure 14:
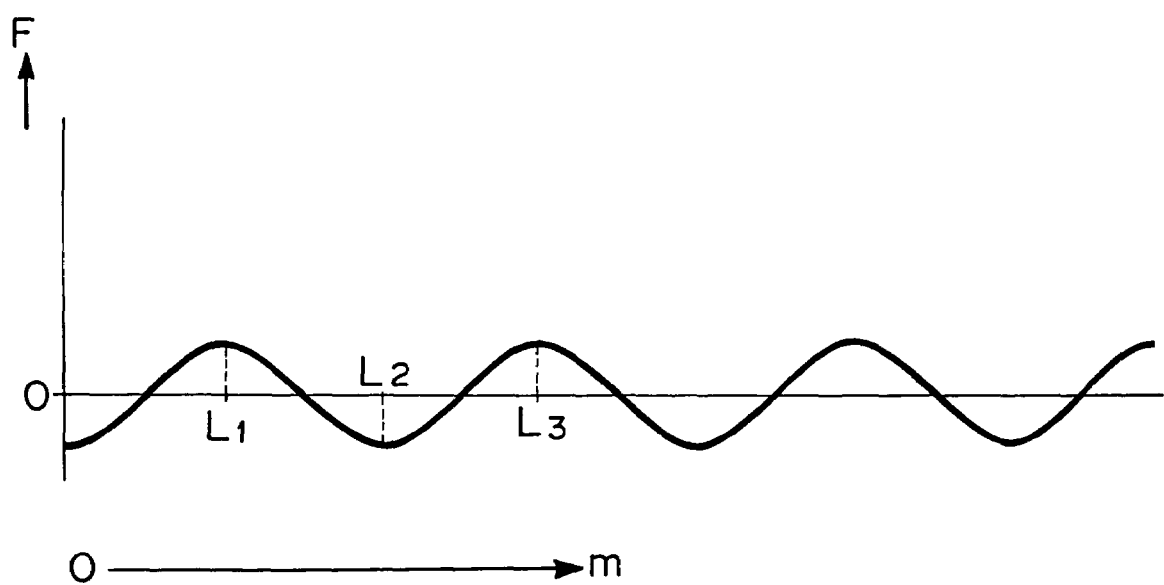
FIG. 14 is a graph showing the relation between vibrating blade length and flutter.

The extent of the "flutter phenomenon" generated by the vibrating blade that accompanies the vibration of vibrating blade 16f within the electrolytic fluid 14 will vary depending on the vibration frequency of the vibration motors 16d, the length of the vibrating blade 16f (dimension from the tip of clamping member 16j to the tip of vibrating blade 16f), and thickness, and viscosity and specific gravity of the electrolytic fluid 14, etc. The length and thickness of the "fluttering" vibrating blade 16f can be well selected based on the applied frequency. By making the vibration frequency of vibrating motor 16d and thickness of vibrating blade 16f fixed values, and then varying the length of vibrating blade 16f, the extent of vibrating blade flutter will be as shown in FIG. 14. In other words, the flutter will increase up to a certain stage as the length of vibrating blade 16f is increased, but when that point is exceeded, the extent F of the flutter will become smaller. As shown in this graph, at a certain length the flutter will be almost zero and if the blade is further lengthened the flutter increase and this process continuously repeats itself.

Preferably a length $L_1$ shown as the No. 1 peak or a length $L_2$ shown as the No. 2 peak is selected for the vibrating blade length. $L_1$ or $L_2$ can be selected according to whether one wants to boost the path vibration or the flow. When L3 shown as the No. 3 peak was selected, the amplitude will tend to diminish.

The above described vibration-stirring means 16 can be used in the vibration-stirring machines (stirrer apparatus) as described in the following documents (These are patent applications relating to the invention of the present inventors.), as well as in JP-B 135628/2001, JP-B 338422/2001 patent applications of the present inventors.
JP-A 275130/1991 (U.S. Pat. No. 1,941,498)
JP-A 220697/1994 (U.S. Pat. No. 2,707,530)
JP-A 312124/1994 (U.S. Pat. No. 2,762,388)
JP-A 281272/1996 (U.S. Pat. No. 2,767,771)
JP-A 173785/1996 (U.S. Pat. No. 2,852,878)
JP-A 126896/1995 (U.S. Pat. No. 2,911,350)
JP-A 40482/1997 (U.S. Pat. No. 2,911,393)
JP-A 189880/1999 (U.S. Pat. No. 2,988,624)
JP-A 54192/1995 (U.S. Pat. No. 2,989,440)
JP-A 33035/1994 (U.S. Pat. No. 2,992,177)
JP-A 287799/1994 (U.S. Pat. No. 3,035,114)
JP-A 280035/1994 (U.S. Pat. No. 3,244,334)
JP-A 304461/1994 (U.S. Pat. No. 3,142,417)
JP-A 43569/1998
JP-A 369453/1998
JP-A 253782/1999

In this invention, the vibrating-stirring means 16 as shown in FIG. 1, may be installed in the electrolytic cells on both ends or may installed in only one electrolytic cell. If using the vibrating blades to extend symmetrically to both sides, then the vibration-stirring means 16 may be installed in the center of the electrolytic cell, and an electrode group may be installed on both sides as described later on.

Using a vibration-stirring means with the vibrating blades in the bottom of the electrolytic cells as described in JP-A 304461/1994, allows a wider installation space for the electrode group within the electrolytic cell. Other advantages are that a larger quantity of gas is emitted from the electrolytic cell (volume) and if the electrodes are installed in the upward and downward directions, then there is no need to use multiple holes as described later on.

Figure 5A:
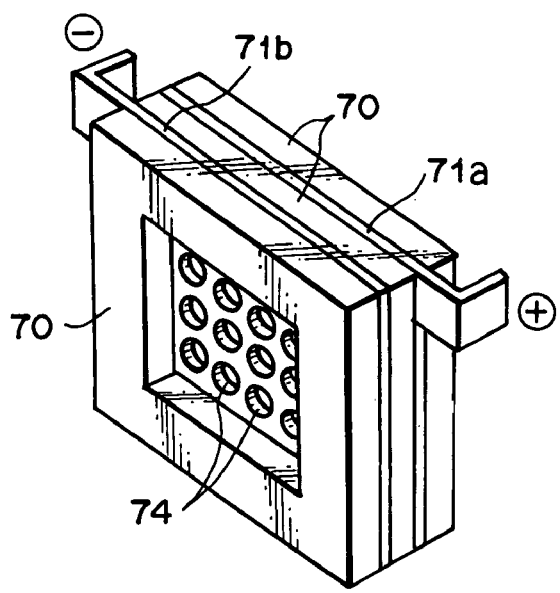
FIG. 5A is a perspective view showing the structure of the electrode group.
Figure 5B:
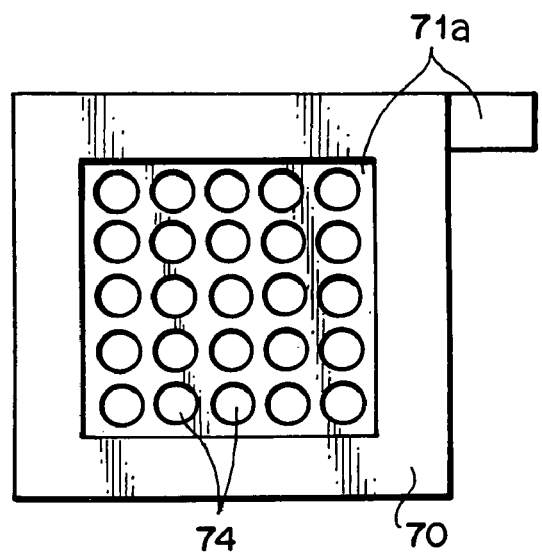
FIG. 5B is a front view showing the structure of the electrode group.
Figure 6A:
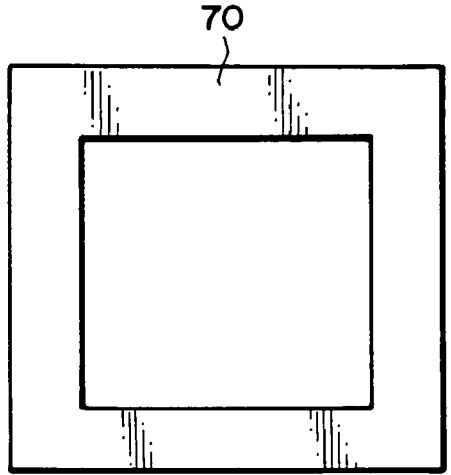
FIG. 6A is a front view showing the insulation frame comprising the electrode group.
Figure 6B:
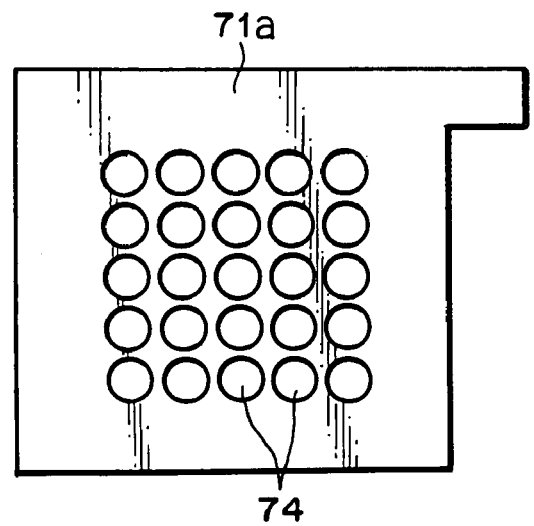
FIG. 6B is a front view showing the electrodes comprising the electrode group.

The description now returns to FIG. 1 and FIG. 2. In the present embodiment, a vibration-stirring means 16 as described above is installed on both ends of the electrolytic cell 10A. Two identical electrode groups $2x$, $2y$ are installed inside the electrolytic cell 10A. The electrode groups $2x$ and $2y$ have a structure as shown in FIG. 5A and FIG. 5B. In other words, an anode 71a as a first electrode, and a cathode 71b as a second electrode are mutually installed in the insulation frame 70. One each anode 71a and one cathode 71b each are shown in FIG. 5A however, the necessary number of anodes 71a and cathodes 71b required for actual use (for example, 25 to 50) are installed. FIG. 6A is a drawing showing the insulation frame 70. FIG. 6B is a drawing showing the anode 71a.

The usual material utilized for hydroelectrolyis may be utilized as the electrode material. Materials such as lead dioxide (lead peroxide), magnetite, ferrite, graphite, platinum, Pt—Ir alloy, titanium alloy, titanium with rare-earth sheath (for example platinum-sheathed titanium) may be used as the anode 71a. Rare earth metals such as rhodium, nickel, nickel alloy, (Ni—Mo$_2$, Ni—Co, Ni—Fe, Ni—Mo—Cd, Ni—S$_x$, Raney nickel, etc.), titanium alloy may be used as the cathode 71b. Natural rubber, synthetic rubber, and plastic may be utilized as materials for the insulation frame 70. A distance is set between the anode 71a and cathode 71b by the thickness of the insulation frame 70. The thickness of insulation frame 70 is within a range of 1 to 20 millimeters, and preferably is 1 to 20 millimeters, and more preferably is 1 to 5 millimeters.

Since the electrode is shaped as a plate as shown in FIG. 1, when the electrode is installed at nearly a right angle to the direction the vibrating blades 16f are facing to cut off the flow of electrolytic fluid 14 generated by the vibration (or agitation) of the vibrating blade 16f of the vibration-stirring means; then multiple small holes 74 must be formed in the electrodes (anode 71a and cathode 71b) as shown in FIG. 5B and FIG. 6B. The electrolytic fluid 14 passing through the small holes 74 can in this way flow smoothly. The holes can be a circular shape or a polygonal shape and there are no particular restrictions on the shape. The size and number of small holes 74 are preferably set to achieve a balance between both the basic purpose of the electrode and the purpose of the porosity. The small holes 74 on the electrode preferably have a surface area of 50 percent or more of the electrode surface in terms of effective surface area (in other words, surface area contacting the electrolytic fluid 14). The porous (multi-hole) electrode may have a net shape.

If the electrode is installed nearly parallel to the direction of current flow of the electrolytic fluid 14, then there is no need to make the electrode porous. However in that case, rather than a ring shape, the insulation frame 70 may be installed at several separate points on the electrode periphery or installed at separate points along the top and bottom edges.

The anode 71a and cathode 71b are respectively connected to an anode main bus-bar 71a' and cathode main bus bar 71b' as shown in FIG. 2. This anode main bus-bar 71a' and cathode main bus bar 71b' are connected to the power supply 34 as shown in FIG. 1.

The power supply 34 may supply direct current and preferably supplies normal low-ripple direct current. However, other power supplies with different waveforms may also be utilized. These types of electrolysis current waveforms are described for example, in the "Electrochemistry" (Society of Japan) Vol. 24, P. 398-403, and pages 449-456 of same volume, the "Electroplating Guide" by the Federation of Electro Plating Industry Association, Japan" Apr. 15, 1996, P. 378-385, the "Surface Technology Compilation" issued by Koshinsha (Corp.) Jun. 15, 1983, P. 301-302, same volume P. 517-527, same volume P. 1050-1053, the Nikkan Kogyo Shinbun "Electroplating Technology Compilation" P 365-369 Jul. 25, 1971, same volume P. 618-622, etc.

In the present invention, among the various pulse waveforms, a rectangular waveform pulse is preferable, particularly in view of the improved energy efficiency. This type of power supply (power supply apparatus) can create voltages with rectangular waveforms from an AC (alternating current) voltage. This type of power supply further has a rectifier circuit utilizing for example transistors and is known as a pulse power supply. The rectifier for these type of power supplies may be a transistor regulated power supply, a dropper type power supply, a switching power supply, a silicon rectifier, an SCR type rectifier, a high-frequency rectifier, an inverter digital-controller rectifier, (for example, the Power Master made by Chuo Seisakusho (Corp.)), the KTS Series made by Sansha Denki (Corp.), the RCV power supply made by Shikoku Denki Co., a means for supplying rectangular pulses by switching transistors on and off and comprised of a switching regulator power supply and transistor switch, a high frequency switching power supply (for using diodes to change the alternating current into direct current, add a 20 to 30 KHz high frequency waveform, and with power transistors apply transforming, once again rectify the voltage, and extract a smooth (low-ripple) output), a PR type rectifier, a high-frequency control type high-speed pulse PR power supply (for example, a HiPR Series (Chiyoda Corp.), etc.

The voltage supplied to each electrode is preferably as uniform as possible. Condensers should preferably be installed at each electrode to ensure this uniform voltage. The voltage applied between the anode 71*a* and the cathode 71*b* should be the same as during normal electrolysis of the water.

The electrolytic fluid 14 is water containing electrolytic material. Here, a soluble alkali metal hydroxide (KOH, NaOH, etc.) or an alkali rare-earth metal hydroxide (for example, Ba (OH)$_2$, Mg(OH)$_2$, Ca(OH)$_2$, etc.) or a ammonium alkyl 4 (tetra-alkylammonium), and materials of the known related art may be used as the electrolytic material. Among these KOH is preferable. The content of electrolytic material in the electrolytic fluid is preferably 5 to 10 percent. The pH of the electrolytic fluid is preferably 7 to 10 percent.

The lid member 10*b* is installed on the upper section of the electrolytic cell 10A as shown in FIG. 1 and FIG. 2. A hydrogen-oxygen gas extraction outlet 10B' is formed for collecting the hydrogen-oxygen gas generated by that lid member. A hydrogen-oxygen gas extraction tube 10B" is connected to that extraction outlet 10B'. The hydrogen-oxygen gas trapping means is comprised of this lid member 10B and hydrogen-oxygen gas extraction tube 10B".

The material for the electrolytic cell 10A and lid member 10B may for example be stainless steel, copper, another metal, or plastic (synthetic resin) such as polycarbonate.

Figure 4:
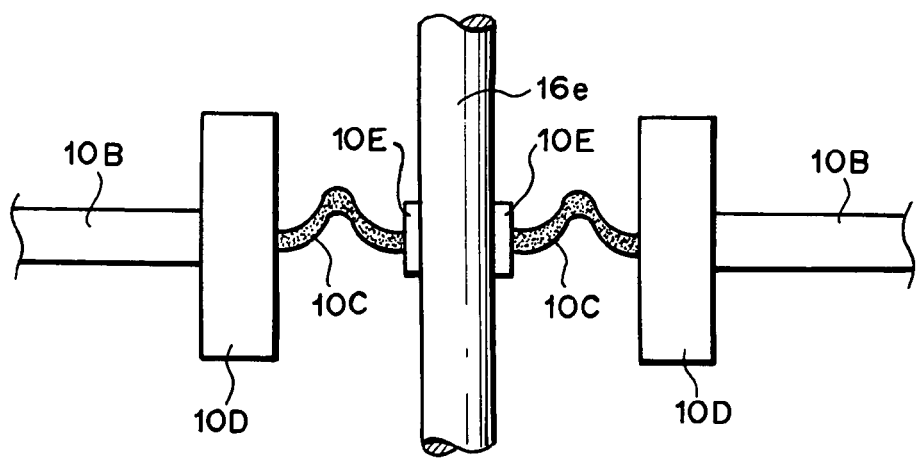
FIG. 4. is an enlarged fragmentary view of the apparatus of FIG. 1.

The vibrating rod 16*e* of the vibration-stirring means 16 extends upwards and downwards through the lid member 10B. As shown in FIG. 4, the opening formed in the lid member 10B section for the vibrating rod 16*e* can be an airtight seal. This airtight seal comprises a flexible member 10C made for example of rubber plate and installed between the clamp member attached to the inner edge of the opening formed in the lid member 10B, and the clamp member attached to the outer surface of the vibrating rod 16*e*. The means for forming an airtight seal may also be an inner ring of a support bearing attached to vibrating rod 16*e*, an outer ring of said support bearing attached to the inner edge of the opening in lid member 10B, and the inner ring is movable up and down along the (rod) stroke versus the outer ring. A stroke unit of this type may for example be the NS-A model (product name) and NS model (product name) made by THK (Corp.). The airtight sealing means may be a rubber plate installed only in the opening in the lid member 10B that the vibrating rod 16*e* passes through, or may be a laminated piece, etc. Rubber, and in particular soft rubber with good shape forming capability may for example be utilized as this sealing means. The vibration width of the vertically oscillating vibrating rod is usually 20 millimeters or less, preferably is 10 millimeters or less, and a width of 5 millimeters is particularly preferable. That (vibration width) lower limit is 0.1 millimeter or more and preferably is about 0.5 millimeters or more. By using a suitable material such as rubber as the sealing member, follow-up motion can be achieved, a satisfactory airtight state obtained with little friction heat.

Figure 26:
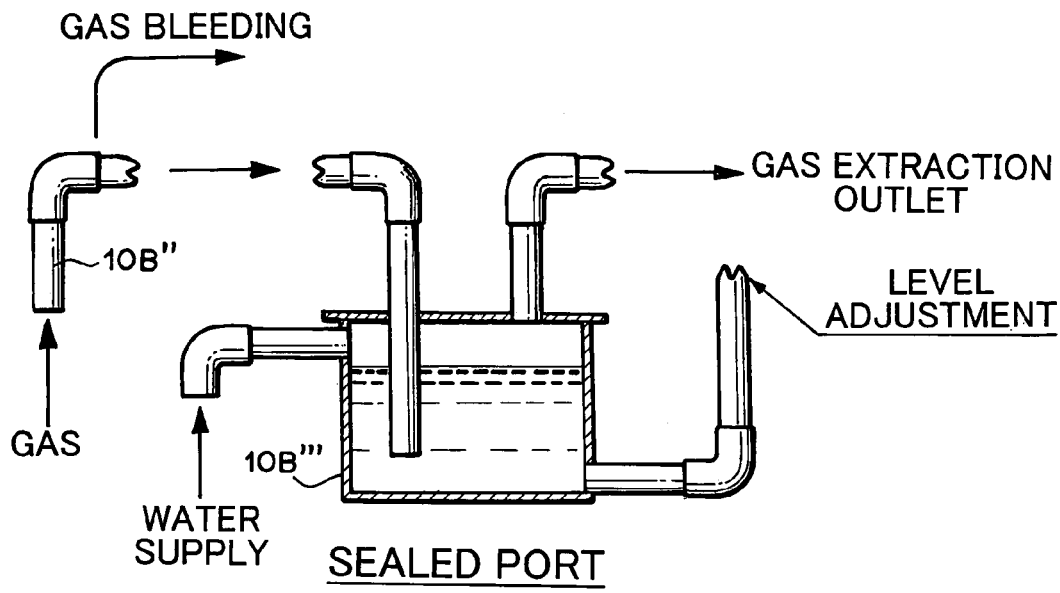
FIG. 26 is a fragmentary view of the gas trapping means of the hydrogen-oxygen gas generator of the present invention.
Figure 27:
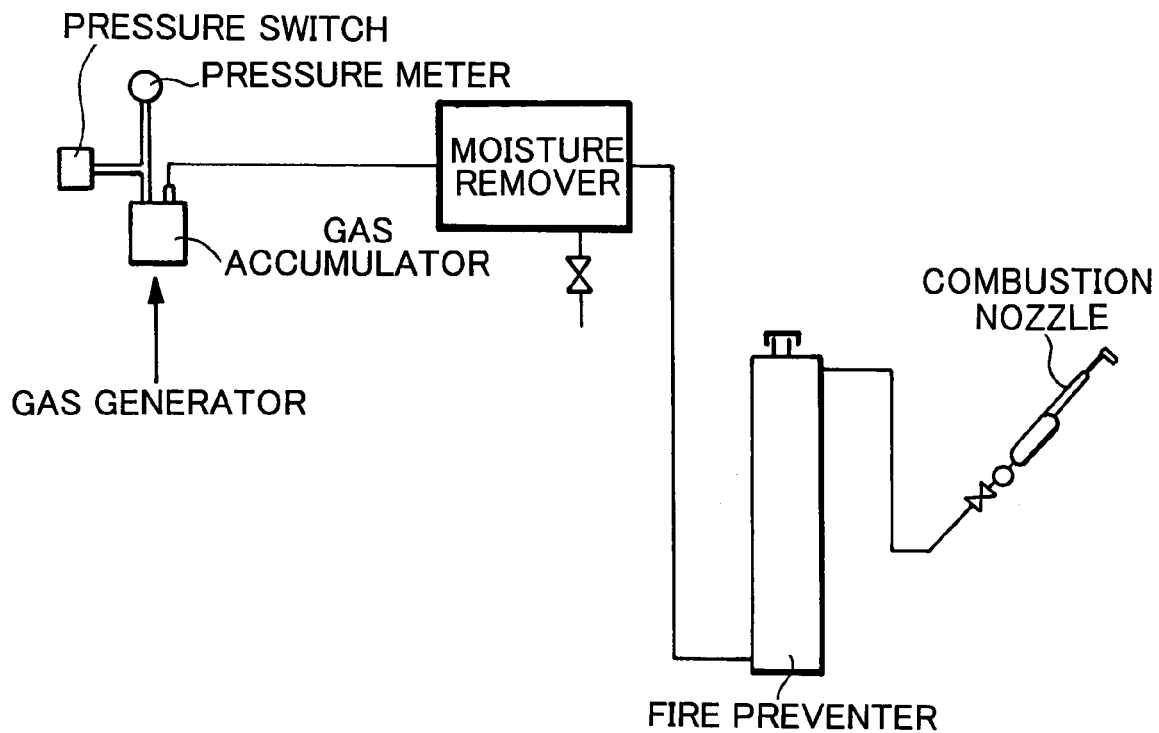
FIG. 27 is a concept view showing one example of the gas combustion device utilizing the hydrogen-oxygen gas collected by the hydrogen-oxygen gas generator.

The electrolysis is preferably performed at a fluid temperature of 20 to 70° C. and an electrical current density of 5 to 20 A/dm2. As shown by FIG. 26, the hydrogen-oxygen gas generated by electrolysis is extracted by way of a seal pot 10B'" connected to the gas extraction tube 10B". The seal pot 10B'" also comprises the gas trapping means. FIG. 27 shows a typical gas combustion device utilizing the hydrogen-oxygen gas recovered from this gas generator. The hydrogen-oxygen gas is collected in the required quantity in the accumulator and passed through a moisture remover and fire preventer before being supplied to the combustion nozzle. This combustion device can be utilized in boilers, gas cutoff equipment, generators, and power sources for aircraft, automobiles, and ships, etc.

The hydrogen-oxygen gas generated by this invention is also known as the so-called brown gas. This gas does not require air for combustion and therefore does not generate environmental pollutants such as nitrous oxides during combustion.

Figure 15:
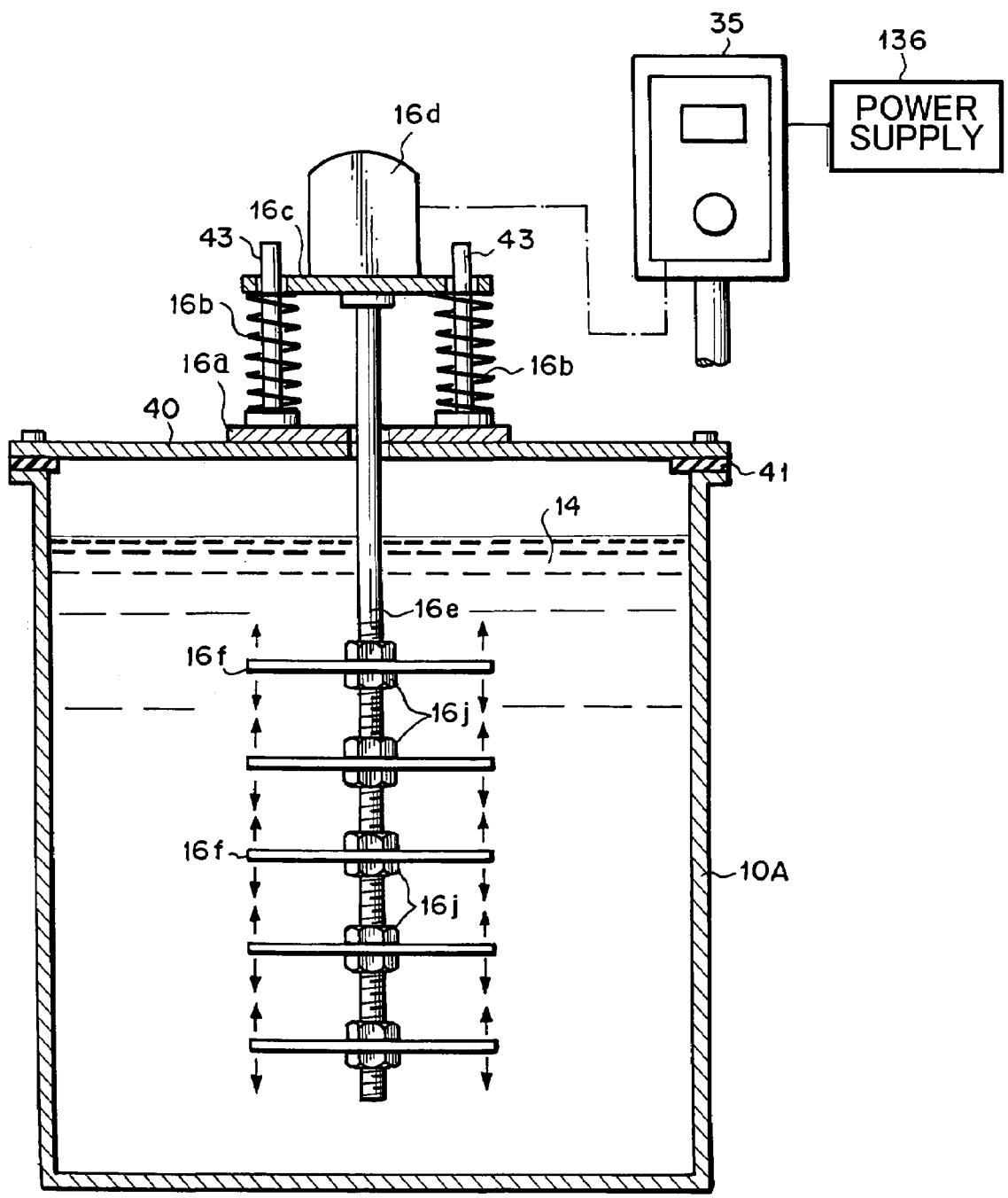
FIG. 15 is a cross sectional view showing a variation of the vibration stirring means.

FIG. 15 is a cross sectional view showing a variation of the vibrating-stirring means. In this example, the base 16*a* is clamped to the installation bed 40 on the upper part of the electrolytic cell 10A by way of the vibration absorbing member 41. A rod-shaped guide member 43 is clamped to the installation bed 40 to extend perpendicularly upwards. This guide member 43 is installed (positioned) within the coil spring 16*b*. A transistor inverter 35 for controlling the frequency of the vibration motor 16*d* is installed between the vibration motor 16*d* and the power supply 136 for driving that motor 16*d*. The power supply 136 is for example 200 volts. The drive means for this vibration motor 16*d* can also be used in the other embodiments of the present invention.

Figure 16:
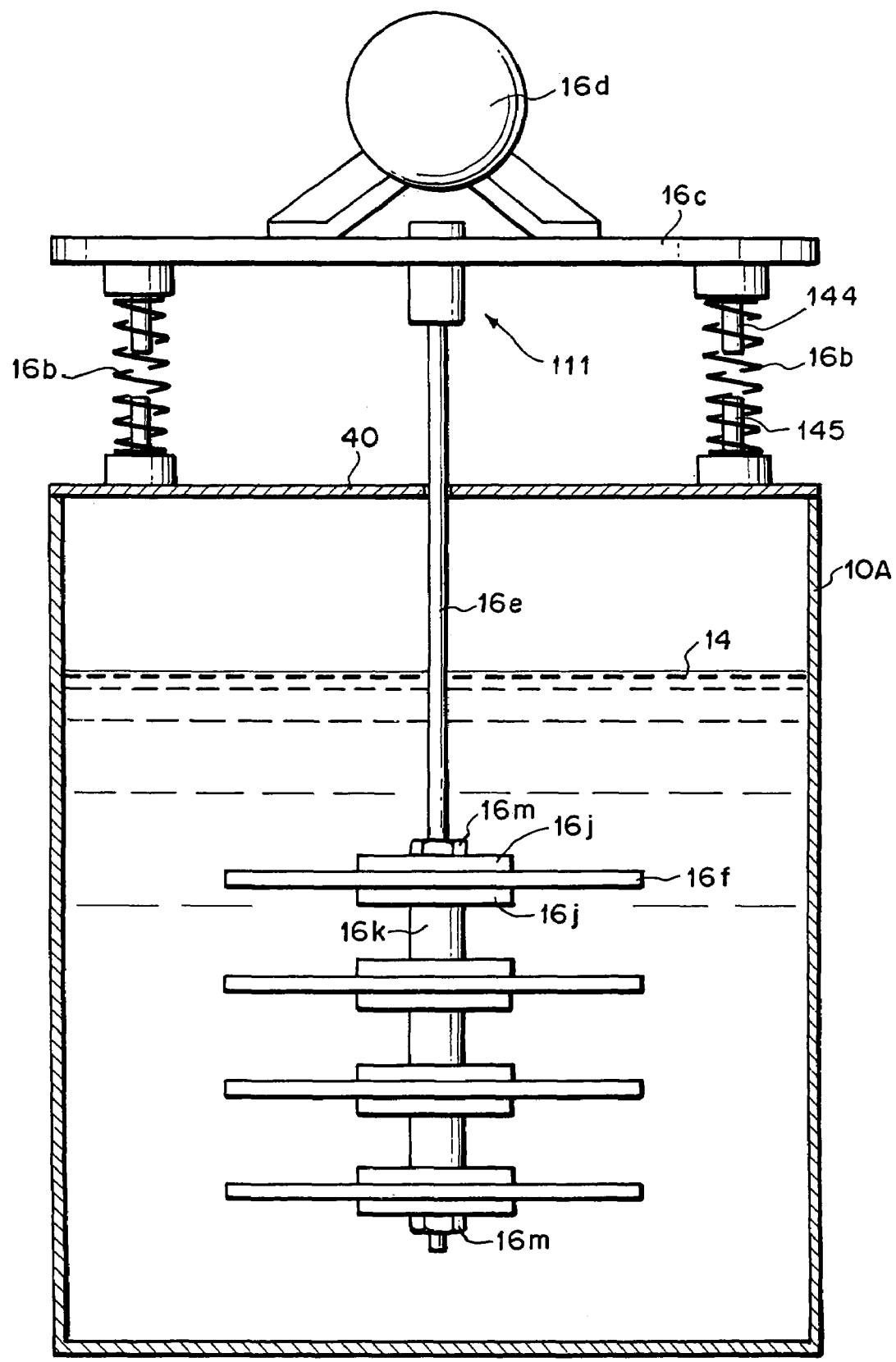
FIG. 16 is a cross sectional view showing a variation of the vibration stirring means.

FIG. 16 is a cross sectional view showing a variation of the vibrating-stirring means. In this example, a rod-shaped upper guide member 144 clamped to a vibrating member 16*c*, extends downwards in a direction perpendicular to the vibrating member 16*c*. A rod-shaped lower guide member 145 clamped to the installation bed 40 extends upwards in a direction perpendicular to the installation bed 40. These guide members 144, 145 are installed (positioned) within the coil spring 16*b*. A suitable space is formed between the bottom edge of the upper side guide member 144, and the upper edge of the lower side guide member 145 to allow vibration of the vibrating member 16*c*.

Figure 17:
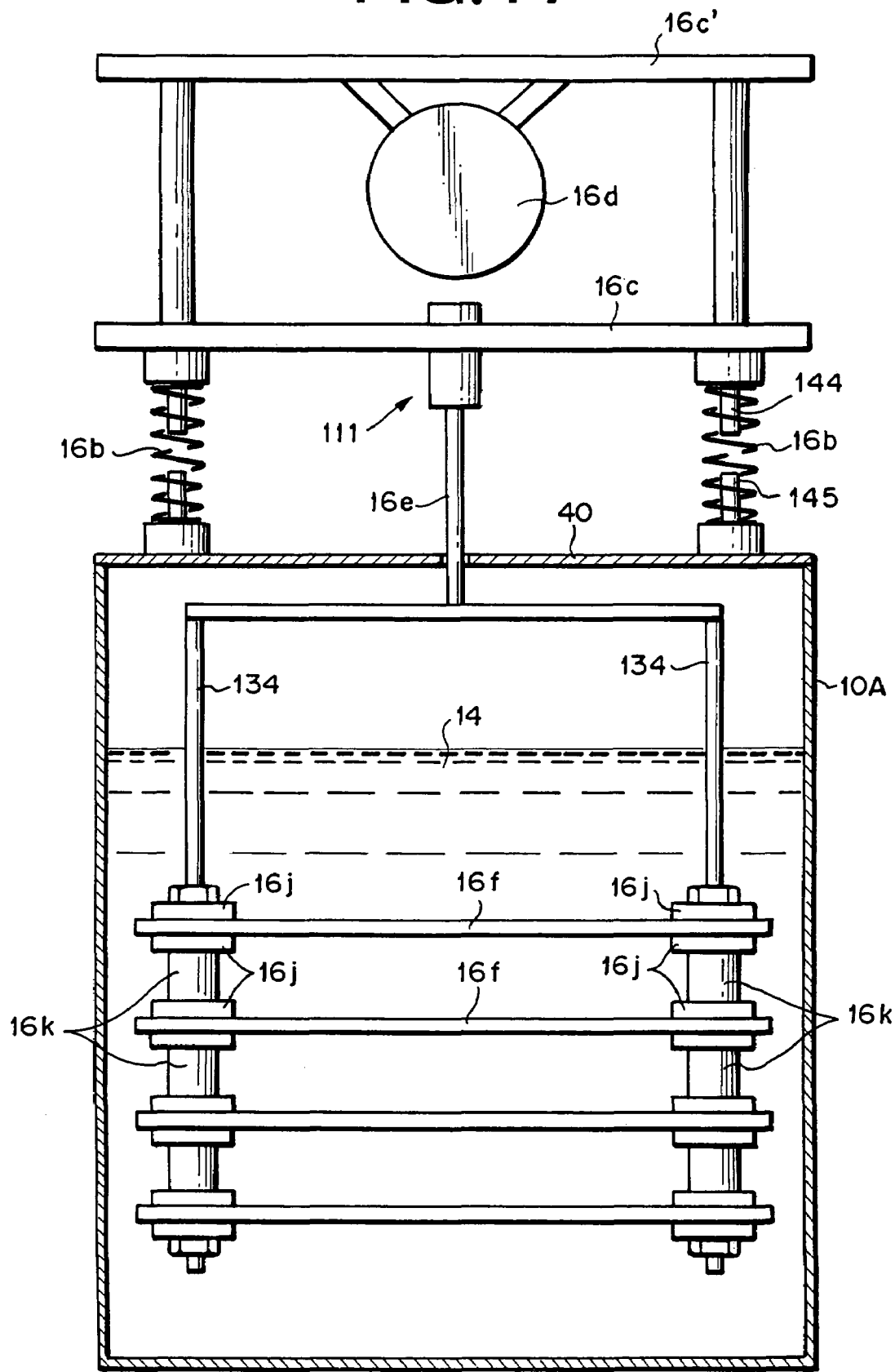
FIG. 17 is a cross sectional view showing a variation of the vibration stirring means.

FIG. 17 is a cross sectional view showing a variation of the vibrating-stirring means. In this example, the vibration motor 16*d* is installed on the lower side of a vibration member 16*c*' attached to the upper side of the vibration member 16. The vibration rod 16*e* branches into two sections 134 inside the electrolytic cell 10A. The vibrating blades 16*f* are installed across these two rod sections 134.

Figure 18:
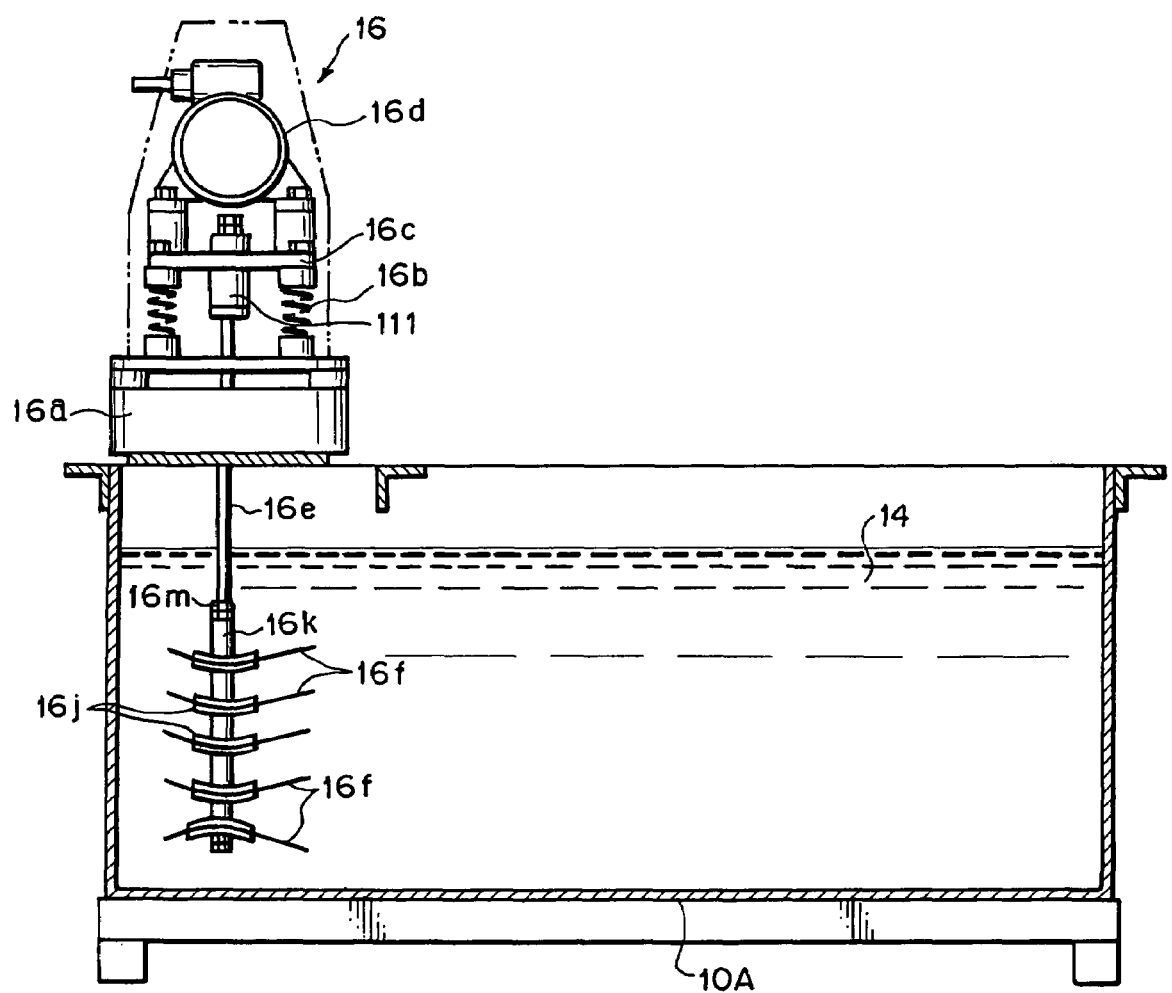
FIG. 18 is a cross sectional view showing a variation of the vibration stirring means.
Figure 19:
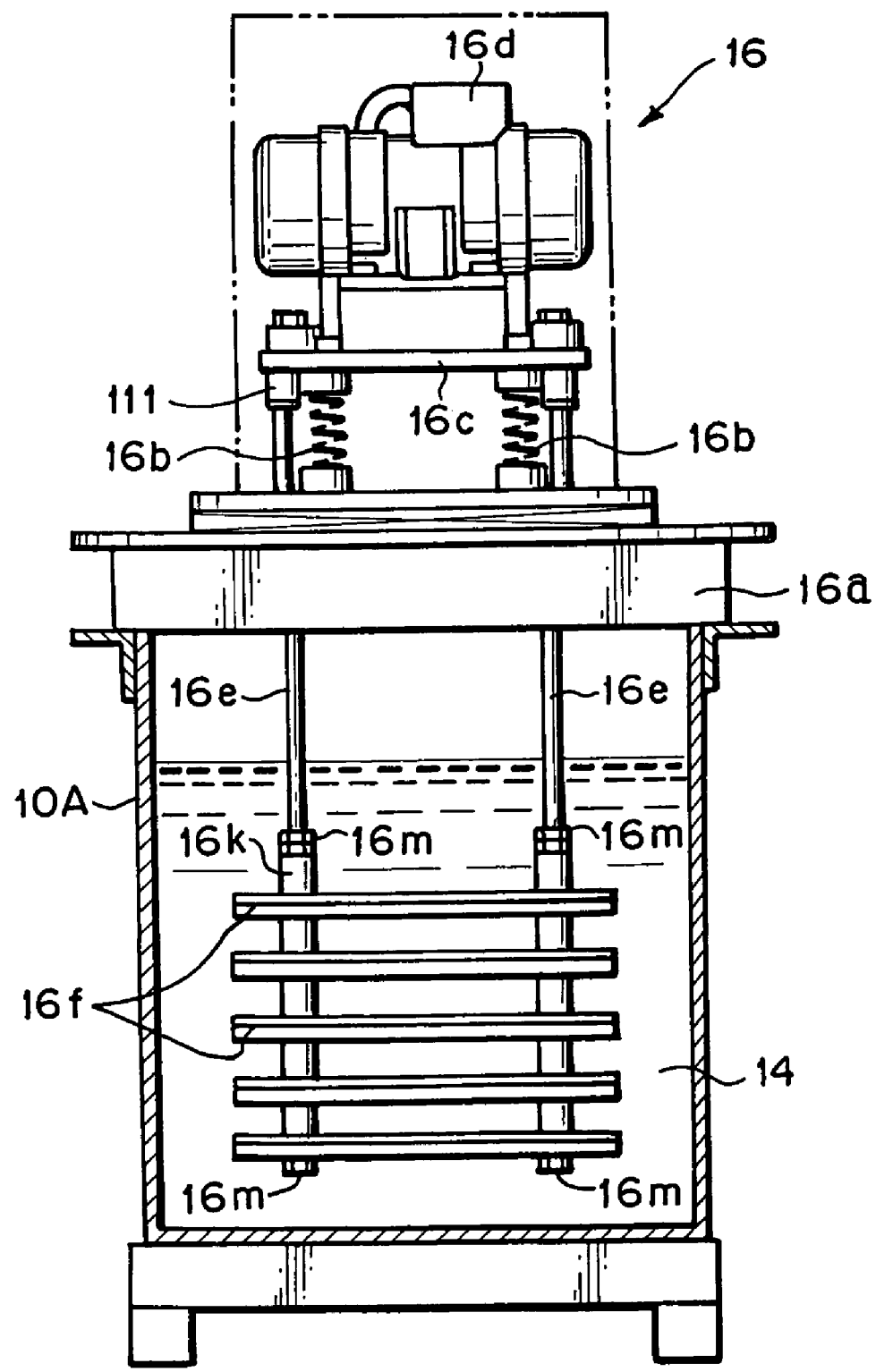
FIG. 19 is a cross sectional view showing a variation of the vibration stirring means.

FIG. 18 and FIG. 19 are cross sectional views showing a variation of the vibrating-stirring means. In this example (FIG. 18), the lowest vibrating blade 16*f* is facing obliquely downwards. The other vibrating blades 16*f* are facing obliquely upwards. The electrolytic fluid 14 nearest the bottom of the electrolytic cell 10A can in this way be adequately vibrated and stirred and accumulation of fluid in the bottom of the electrolytic cell can be prevented. The vibrating blades 16*f* may also all be set facing obliquely downwards.

Figure 20:
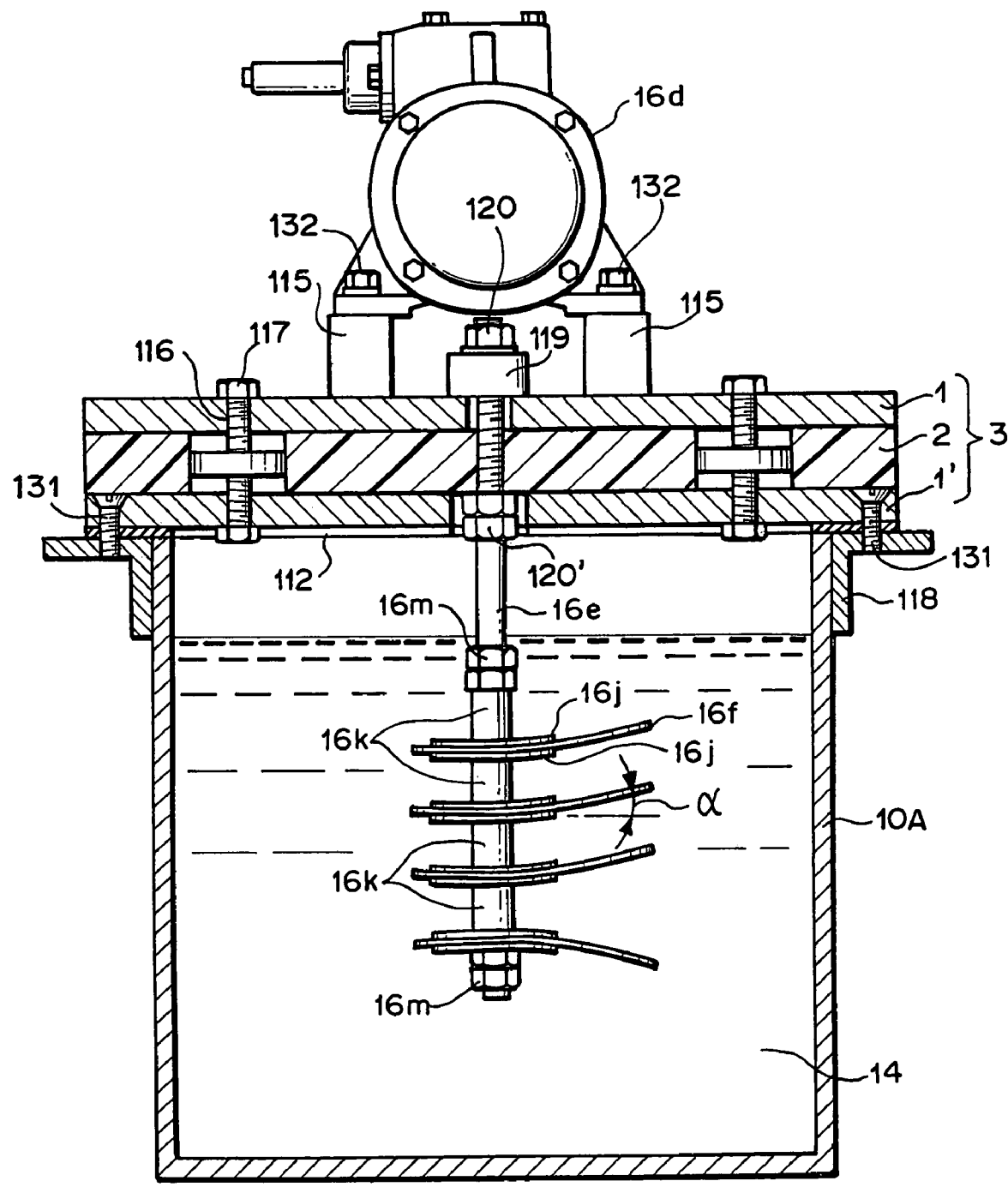
FIG. 20 is a cross sectional view showing another installation state of the vibration stirring means onto the electrolytic cell of the present invention.
Figure 21:
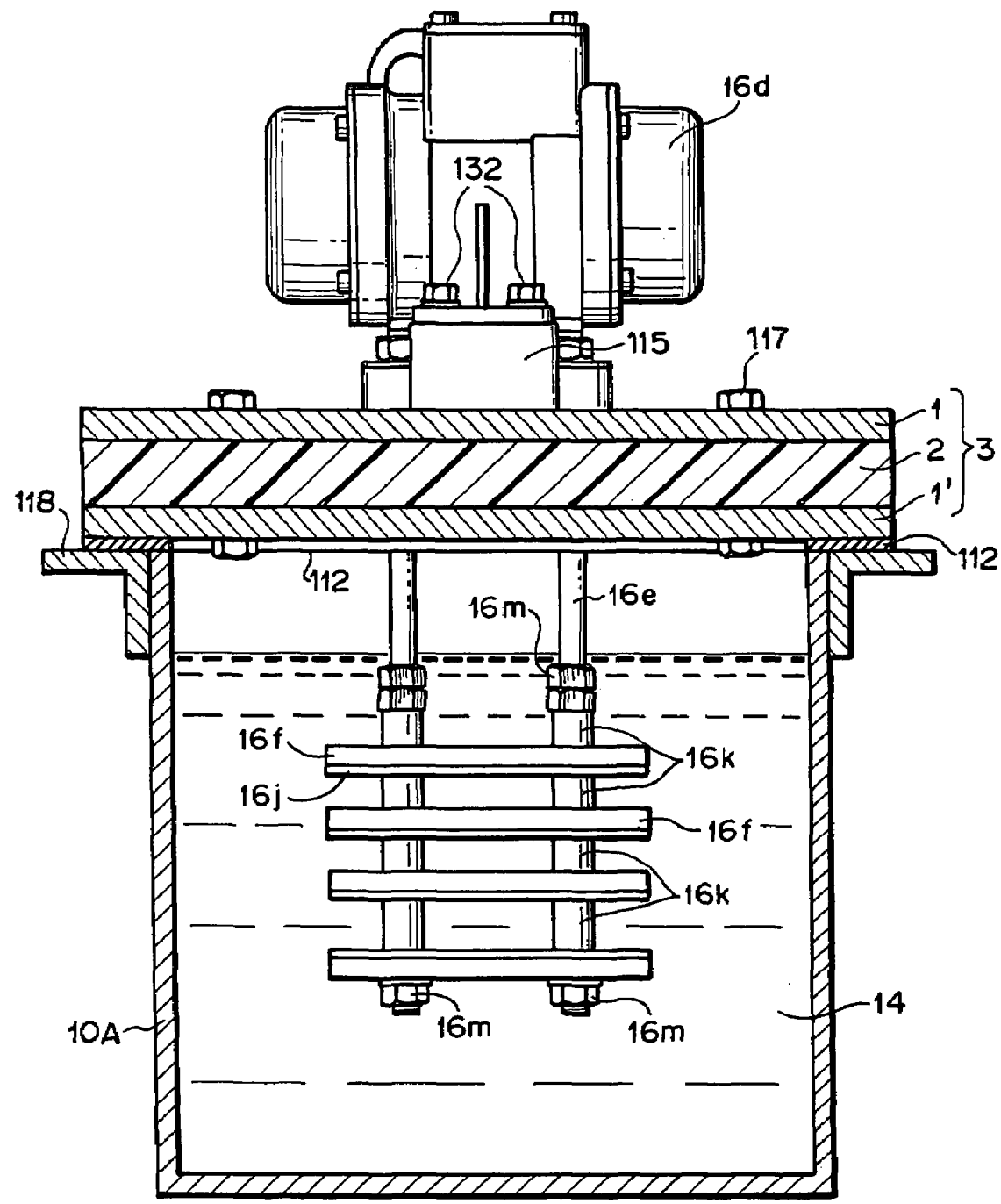
FIG. 21 is a cross sectional view of the apparatus shown in FIG. 20.
Figure 22:
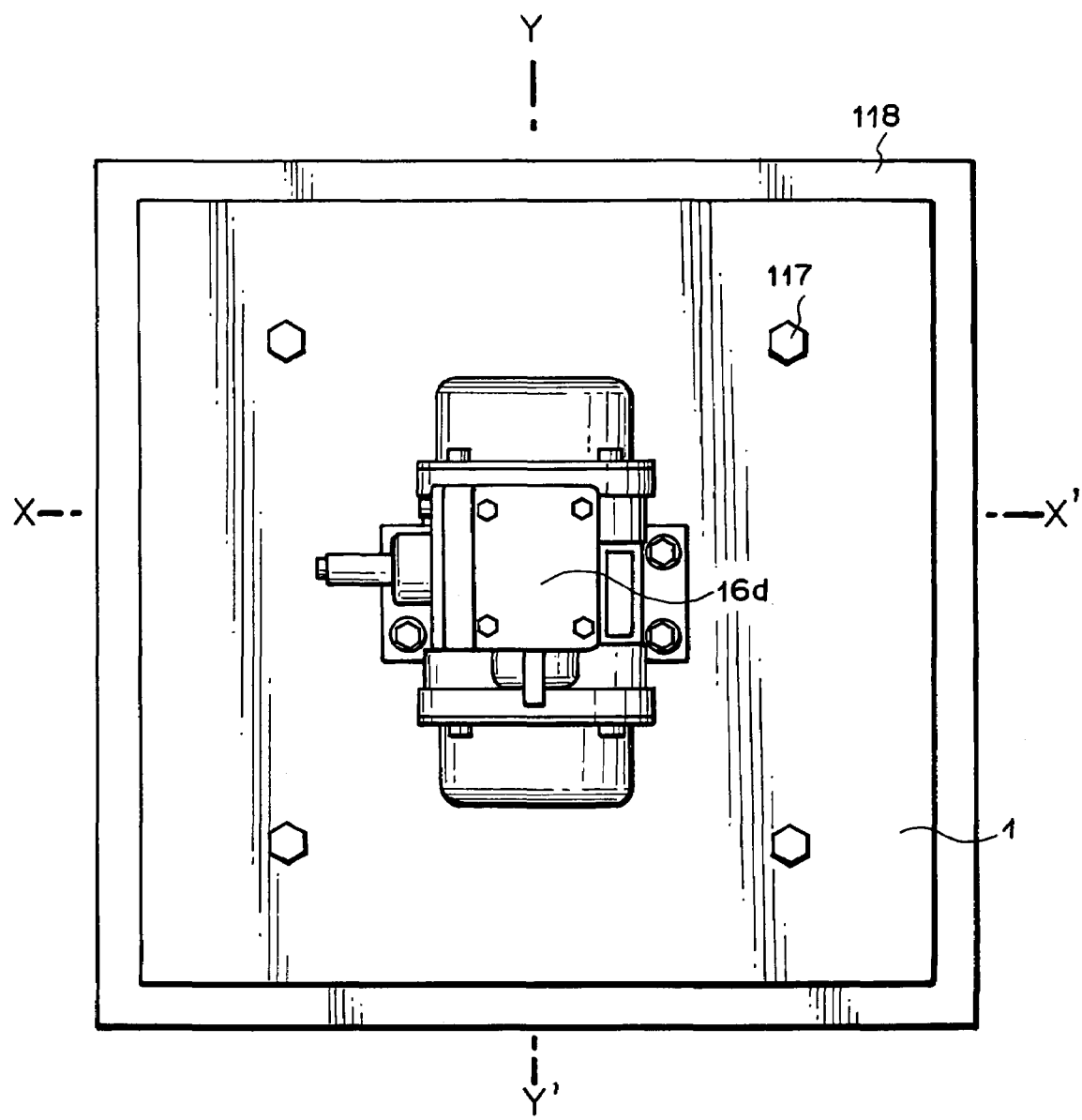
FIG. 22 is a flat view of the apparatus shown in FIG. 20.

FIG. 20 and FIG. 21 are cross sectional views showing another installation state of the vibration-stirring means onto the electrolytic cell of the present invention. FIG. 22 is a flat view of that installation state. FIG. 20 and FIG. 21 are views taken respectively along lines X-X' and lines Y-Y' of a cross section of FIG. 22.

In this state, a laminated piece 3 comprised of a rubber plate 2 and the metal plates 1, 1' is utilized as the vibration absorbing member instead of the coil spring 16*b*. In other words, the laminated piece 3 is clamped by way of an anti-vibration rubber 112 to a bracket members 118 affixed to an upper edge of electrolytic cell 10A by using the metal plate 1' and bolt 131. The rubber plate 2 is installed on the that metal plate 1', the metal plate 1 installed on top of that rubber plate 2. This assembly is then integrated into one piece by the bolts 116 and 117.

The vibration motor 16*d* is clamped by a bolt 132 and a vibration support member 115 to a metal plate 1. The upper edge of the vibrating rod 16*e* is installed by way of a rubber ring 119 to the laminated piece 3 with the metal plate 1 and rubber plate 2. In other words, the upper metal plate 1 renders the functions of the vibration member 16*c* described in FIG. 1 and other embodiments. The lower metal plate 1' renders the functions of the base 16a described in FIG. 1 and other embodiments. The laminated piece 3 (mainly the rubber plate 2) containing the metal plates 1, 1' renders the vibration absorbing functions identical to the coil spring 16b described in FIG. 1 and other embodiments.

FIGS. 23A through 23C are flat views of the laminated piece 3. In the example in FIG. 23A corresponding to the states in FIG. 20 through FIG. 22, a (through) hole 5 is formed in the laminated piece 3 to allow passage of the vibrating rod 16e. In the example in FIG. 23B, the holes 5 on the laminated piece 3 are separated by a dividing line into two sections 3a and 3b to allow easy passage of the vibrating rod 16e when assembling the device. In the example in FIG. 23C, the laminated piece 3 forms a ring-shape corresponding to the upper edge of the electrolytic cell 10A and an opening 6 is formed in the center section.

In the examples in FIG. 23A and FIG. 23B, the upper edge of the electrolytic cell 10A is sealed by the laminated piece 3. The laminated piece 3 in this way functions the same as the lid member 10B.

FIG. 24A and FIG. 24B are cross sectional views showing the state of the electrolytic cell sealed by the laminated piece 3. In FIG. 24A, the rubber plate 2 makes direct contact with the vibrating rod 16e in (through) holes 5 forming a seal. In FIG. 24B, a flexible seal member 136 is installed between the vibrating rod 16e and laminated piece 3 to seal the opening 6.

In FIG. 25A through FIG. 25E, a laminated piece 3 serves as the vibration absorbing material. In the example in FIG. 25A, the laminated piece is made up of the metal plate 1 and the rubber plate 2. In the example in FIG. 25A, the laminated piece 3 is made up of an upper metal plate 1 and upper rubber plate 2 and lower metal plate 1' and lower rubber plate 2'. In the example in FIG. 25D, the laminated piece 3 is made up of an upper metal plate 1, an upper rubber plate 2, an intermediate metal plate 1", a lower rubber plate 2' and a lower metal plate 1'. The number of metal plates and rubber plates in the laminated piece 3 can for example be from 1 to 5 pieces. In the present invention, the vibration absorbing member can also be comprised of only the rubber plate.

Stainless steel, steel, copper, aluminum and other suitable alloys may be used as the metal plates 1, 1' and 1". The thickness of the metal plate may for example be from 10 to 40 millimeters. However, metal plate (for example, the intermediate metal plate 1') not directly clamped to members other than the laminated piece can be thin with a dimension from 0.3 to 10 millimeters.

Synthetic rubber or vulcanized natural rubber may be used as the material for the rubber plates 2 and 2'. The rubber plate 2 and 2' are preferably anti-vibration rubber as specified in JISK6386. The rubber plate in particular has a static shearing resilience of 4 to 22 $kgf/cm^2$ and preferably of 5 to 10 $kgf/cm^2$ and preferably has an elongation of 250 percent or more. Rubber specified for use as synthetic rubber includes: chlorophene rubber, nitrile rubber, nitrile-chlorophene rubber, styrene-chlorophene rubber, acrylonitrile butadiene rubber, isophrene rubber, ethylene propylene diene copolymer rubber, epichlorylhydrine rubber, alkylene oxide rubber, fluorine rubber, silicon rubber, urethane rubber, polysulfide rubber, phosphorbine rubber. The rubber thickness is for example 5 to 60 millimeters.

Figure 25A:
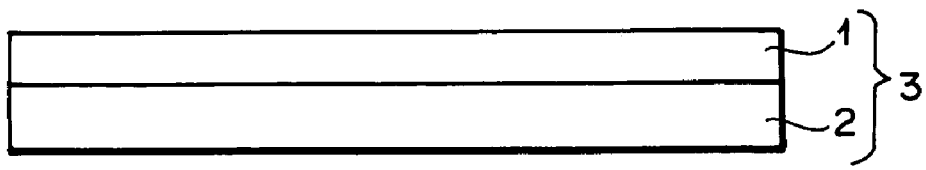
FIG. 25A through FIG. 25E are cross sectional view of the laminated piece.
Figure 25B:
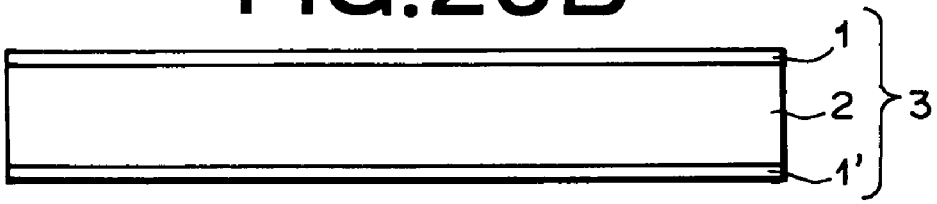
Figure 25C:
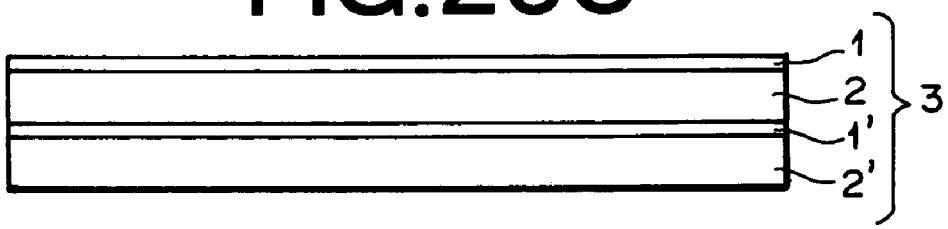
Figure 25D:
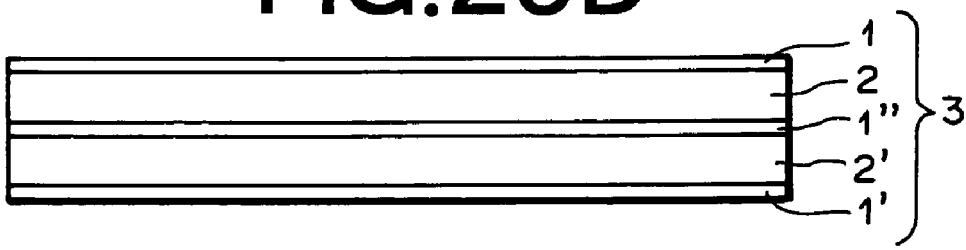
Figure 25E:
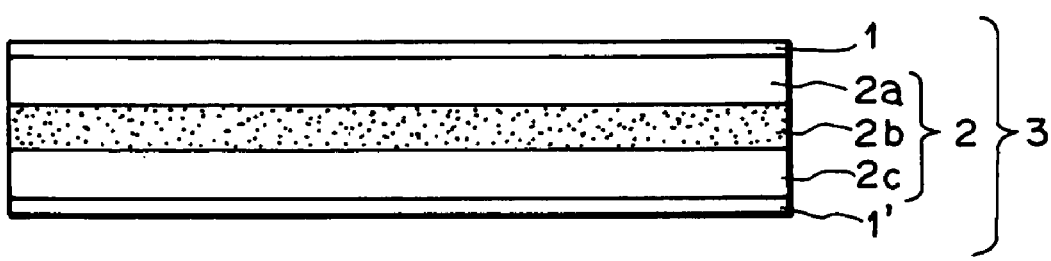

In the example in FIG. 25E, the laminated piece 3 is made up an upper metal plate 1, a rubber plate 2 and a lower metal plate 1' The rubber plate 2 is made up of an upper solid rubber layer 2a and sponge rubber layer 2b and lower solid rubber layer 2c. One of either the lower solid rubber layer 2a and 2c may be eliminated. A stack or lamination comprised of multiple solid rubber layer and multiple sponge rubber layers may also be used.

Figure 28:
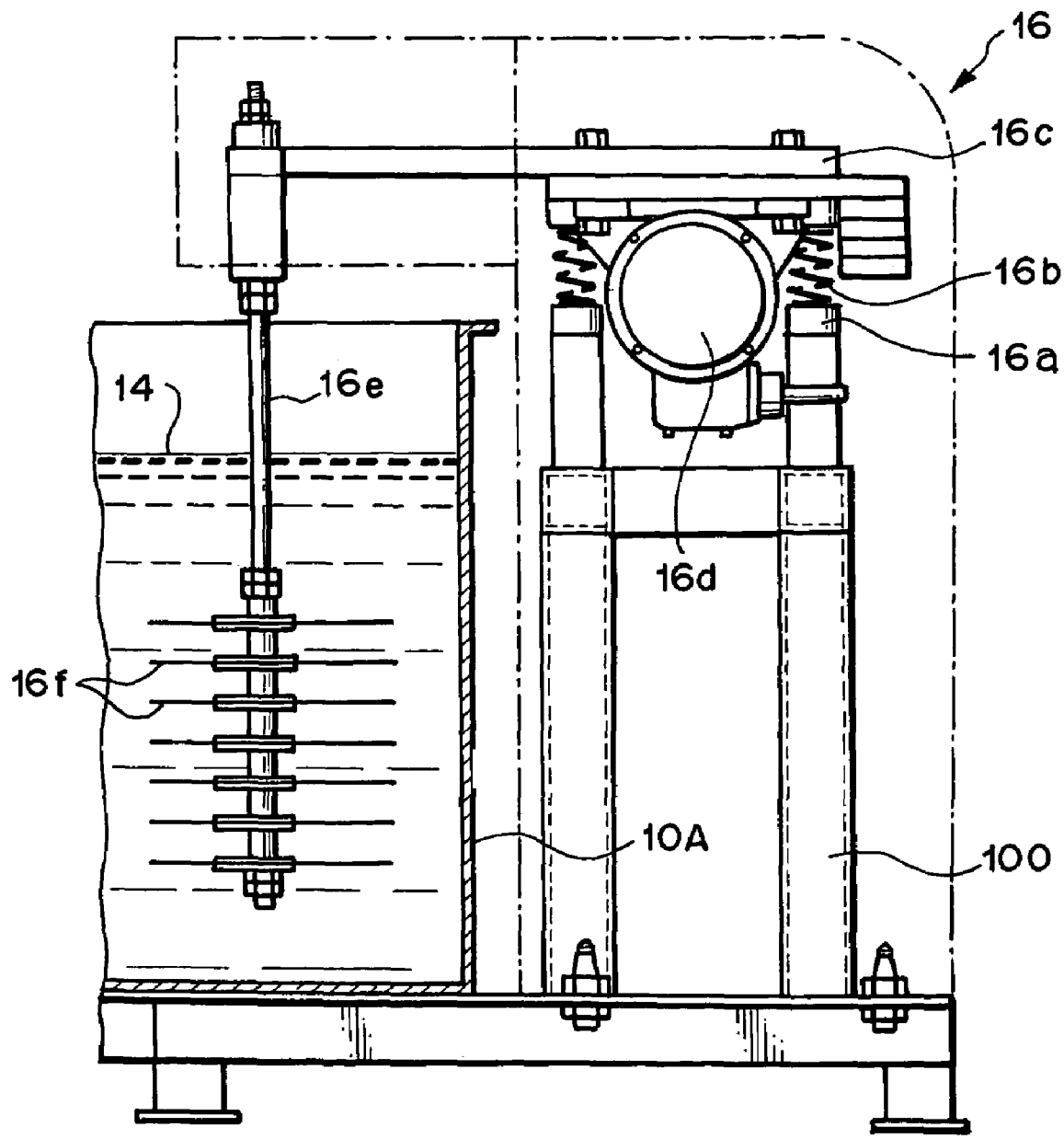
FIG. 28 is a cross sectional view showing a variation of the vibration stirring means.

FIG. 28 is a cross sectional view showing a variation of the vibration stirring means. In this example, the vibration motor 16d is installed on the side of the electrolytic cell 10A. The vibration member 16c extends horizontally above the electrolytic cell 10A, The vibration member 16c is installed onto the vibrating rod 16e. A structure of this type allows the lid member 10B to be easily attached or detached from the electrolytic cell 10A.

Figure 29:
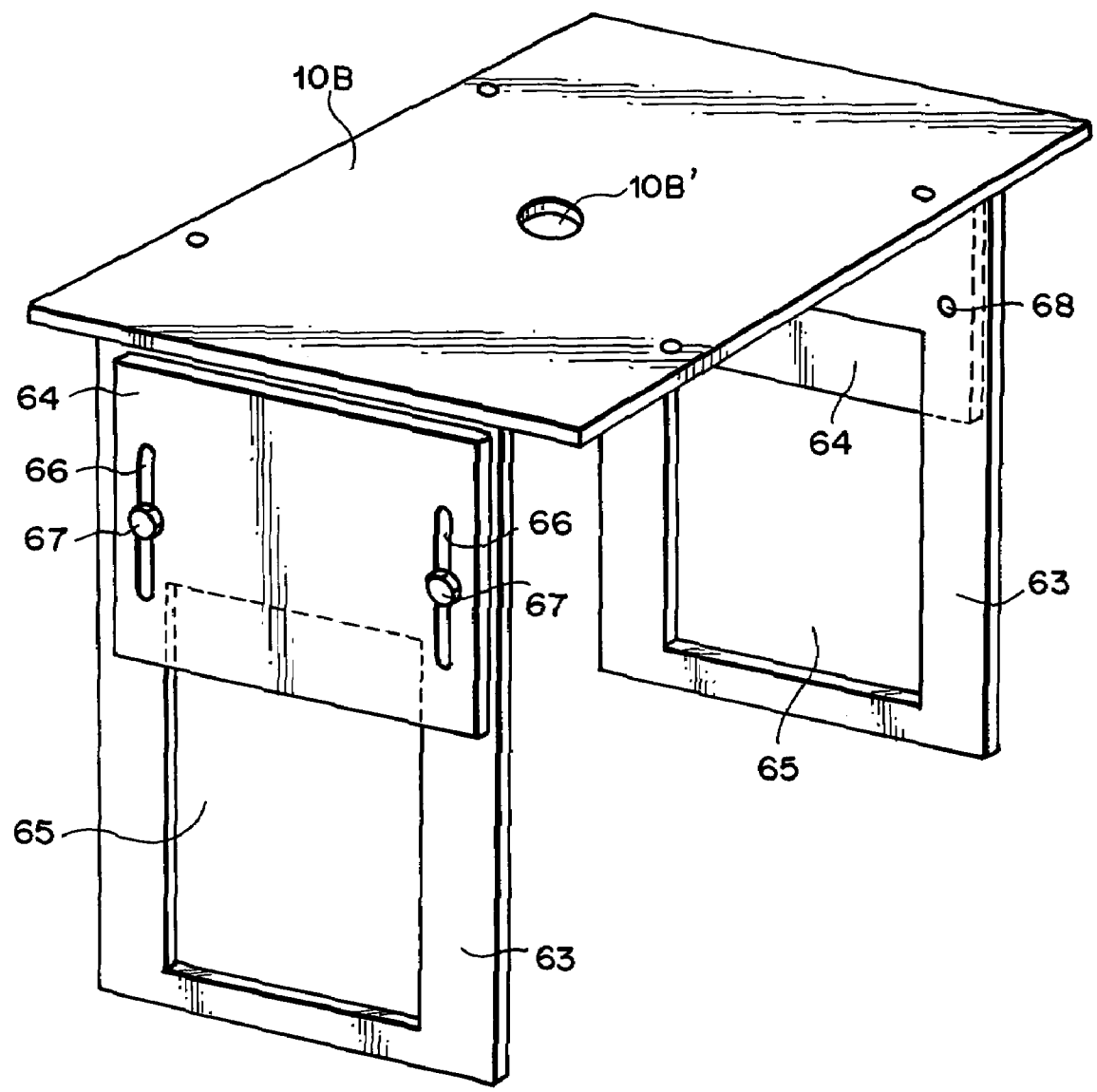
FIG. 29 is a perspective view showing a variation of the lid member.

FIG. 29 shows a variation of the lid member 10B. In this example, the lid member 10B is attached to the electrolytic cell 10A only at the upper section of the electrode groups 2x, 2y shown in FIG. 1. An enclosure member 63 is attached extending downwards on both ends of the lid member 10B. An opening 65 is formed in this enclosure member 63 to allow electrolytic fluid to flow into the lower section immersed in electrolytic fluid. A cover plate 64 can be installed to be upward or downward adjustable to cover a section of the upper area of that opening 65. To make the cover plate 64 adjustable, slots 66 oriented upwards and downwards can be formed on the cover plate 64, and bolts 67 fit into the screw holes 68 formed in the enclosure member 63 for adjustment by means of the slots 66. Adjusting the vertical position of the cover plates 64 allows adjusting the fluid level above the electrode groups 2x, 2y and therefore adjusting the gas pressure.

The vibrating rod 16e does not pass through the lid member of the vibration-stirring means when using this type of lid member. A sealed structure is preferable in this case, in order to improve hydrogen-oxygen gas recovery efficiency and prevent the electrolytic fluid from scattering (into the air).

The present invention can also be applied to gas generator device to separate and recover the hydrogen and oxygen by electrolysis by installing a film between the anode and cathode at intervals to separate the hydrogen and oxygen. This type of separation and recovery gas generator is described for example, in a report entitled, "Development of 2500 $cm^2$ Solid Polymer Electrolyte Water Electrolyzer in WE-NET" by M. Yamaguchi, et al.

The embodiment of the present invention is described next. The present invention however is not limited to these embodiments.

First Embodiment

Utilizing the device as described in FIG. 1 through FIG. 3, but with the lid member 10B described in FIG. 29, hydrogen-oxygen gas was generated and collected under the following conditions.

Electrolytic cell and lid member:
Manufactured from stainless steel
270 mm×1660 mm×390 mm (H)
Vibration generating means:
Vibration motor; Uras Vibrator manufactured by Murakami Seiki Seisakusho (Corp.) (product name), 250W×3-phase×200 V, 2-axis type,
Vibrating blades: Manufactured from stainless steel (SUS304), 6 blades
Vibrating rod: Manufactured from titanium, 12 mm diameter
Spacers: 12 pieces, manufactured from titanium
Clamp members for vibrating blades; 12 pieces
Packing for vibrating blades: 12 sheets, manufactured by Teflon (registered trademark)

Electrode group:
Anodes: 50 sheets, made from platinum plated titanium alloy capable of long-term use without film oxidation
Cathodes: 50 sheets, made from titanium alloy
Insulation frame: Synthetic rubber, thickness 5 mm
Electrolytic fluid: KOH added as electrolytic material at 8 percent by weight to distilled water, temperature 55° C., pH10
Voltage applied across cathode and anode: 2.0 volts (direct current)
Electrical current density: 5 A/dm$^2$
Hydrogen-oxygen gas collection rate was 1,000 liters per hour.

Second Embodiment

Other than utilizing an AC multiplex current as described in "Electrochemistry" (Society of Japan) Vol. 24, P. 398-403, and pages 449-456 of same volume, the same structure as in the first embodiment was utilized.

Hydrogen-oxygen gas collection rate was 1,200 liters per hour.

After continuous operation over a period of one month, stable collection of hydrogen-oxygen gas was achieved at a power consumption lower than the first embodiment.

Third Embodiment

Other than using a 270 mm×850 mm×340 mm (H) structure as the electrolytic cell, and using one Hifrerrous KHE-2-2T [100 to 120 Hz] unit manufactured by Murakami Seiki Seisakusho (Corp.) (product name) as the vibration motor, the same structure as in the first embodiment was utilized.

Hydrogen-oxygen gas collection rate was 800 liters per hour.

Fourth and Fifth Embodiments

Other than using the seal described in FIG. 20 through FIG. 24B at the position for the vibration-stirring means not attached to the lid member 10B, the same structures as in the first and second embodiments were utilized.

The fourth embodiment implemented the same as the first embodiment, has a hydrogen-oxygen gas collection rate of 2,000 liters per hour. The fifth embodiment implemented the same as the second embodiment, has a hydrogen-oxygen gas collection rate of 2,500 liters per hour. Both of these embodiments represent a large improvement.

Sixth Embodiment

Other than using a power supply such as the SCR type 6-phase half-wave rectifier pulse power supply as described in P.367-368 of "Electroplating Technology Compilation" issued by the Nikkan Kogyo Shinbun in Jul. 25, 1971, the same structure as in the first embodiment was utilized.

The hydrogen-oxygen gas collection rate of 2,200 liters per hour in spite of the fact that energy consumption was less than in the first embodiment.

Seventh Embodiment

Other than using the components described in FIG. 1 through FIG. 3 as the lid member 10B, the same structure as in the first embodiment was utilized.

The hydrogen-oxygen gas collection rate of 3,000 liters per hour. This rate is a large improvement compared to the first embodiment.

Eighth Embodiment

Other than using the Power Master PND-1 model multifunction rectifier using the inverter digital control method and made by Chuo Seisakusho (Corp.) as the power supply 34, and using a rectangular waveform pulse power supply (power-on 0.08 seconds, power-off 0.02 seconds), the structure is identical to the seventh embodiment. The hydrogen-oxygen gas collection rate of 3,500 liters per hour in spite of the fact that energy consumption was less than in the first embodiment.

The present invention configured as described above rendered the following effects.

(1) Using with the vibration-stirring means revealed the startling fact that electrolysis was satisfactory even with a gap between electrodes of 20 millimeters or less. Consequently, the generation of hydrogen-oxygen gas was tremendously improved.

(2) Along with reducing the gap between electrodes, the amount of hydrogen-oxygen gas generated by one gas generator was enormously improved.

(3) Using the vibration-stirring means ensures that large bubbles do not occur in the oxygen-hydrogen gas generated in the electrolytic fluid, and that electrical resistance remains small.

(4) The present invention allows a flexible response to large power demands by utilizing inexpensive electrical power at night, and generating and storing oxygen-hydrogen gas for use when needed. Utilizing a direct current pulse waveform power supply for electrolysis allows even further savings in electrical power.

(5) The apparatus of the present invention allows utilizing cassette fuel tanks as a safe, non-hazardous fuel supply source for cooking stoves.

(6) Using the gas obtained from the present invention provides an air conditioning apparatus superior to conventional accumulator (heat storage) air conditioning.

(7) Using the gas generated by the present invention allows combusting small, intermediate and large municipal trash and industrial wastes in an incinerator. Trash can in this way be incinerated without pollution in a highly economical method.

(8) The apparatus of the present invention can be utilized to supply fuel to boilers and gas turbines, etc.

(9) The present invention can serve effectively as a clean, non-polluting gas generator device for cities.

(10) The present invention can serve effectively as a fuel production apparatus for ships.

(11) The present invention provides satisfactory, uniform gas generation even without implementing a special means such as gas propeller agitation.

The invention claimed is:

1. A hydrogen-oxygen gas generating method comprising:
(a) utilizing a hydrogen-oxygen gas generator comprising:
an electrolytic cell,
an electrode group formed from a first electrode and a second electrode mutually installed in said electrolytic cell,
a power supply for applying a voltage across said first electrode and said second electrode,
a vibration-stirring means for stirring and agitating an electrolytic fluid stored within said electrolytic cell; and
a gas trapping means for collecting the hydrogen-oxygen gas generated by electrolyzing the electrolyte fluid, wherein said vibration-stirring means is comprised of a vibration motor, a vibrating rod linked to the vibration motor and extending vertically into the electrolytic cell, and a vibrating blade unable to rotate, installed on said vibrating rod in at least one level, and wherein said gas trapping means is comprised of a lid member which is installed on said electrolytic cell, seals said electrolytic cell and has a hydrogen-oxygen gas extraction outlet and an opening through which said vibrating rod extends, a hydrogen-oxygen gas extraction tube connected to said hydrogen-oxygen gas extraction outlet, a sealing means which is provided between said lid member and said vibrating rod, allows vibration of the vibrating rod in a vertical direction and prevents passage of the hydrogen-oxygen gas, and a seal pot connected to said hydrogen-oxygen gas extraction tube;

(b) utilizing said electrolytic fluid consisting 5 to 10 percent by weight of electrolytic material having pH between 7 to 10;

(c) performing electrolysis of the electrolytic fluid under the condition that the distance between said first and second electrodes adjacently installed within said electrode group is set within a range of 1 to 20 millimeters, the vibration motor vibrates at 10 to 200 Hertz, the vibrating rod-vibrates in the vertical direction, the tip of the vibrating blade vibrates in the electrolytic fluid at an amplitude of 0.1 to 15.0 millimeters and a frequency of 200 to 1,000 times per minute, the temperature of the electrolytic fluid is set to 20 to 70 degrees centigrade, and an electrical current density is 5 A/dm$^2$ to 20 A/dm$^2$; and (d) performing collection of the hydrogen-oxygen gas generated by the electrolysis, wherein the hydrogen-oxygen gas is collected by way of said seal pot.

2. A hydrogen-oxygen gas generating method according to claim 1, wherein said electrolytic material is a water-soluble alkali metal hydroxide or an alkali-earth metal hydroxide.

3. A hydrogen-oxygen gas generating method according to claim 1, wherein said power supply is a direct current pulse power supply.

4. A hydrogen-oxygen gas generating method according to claim 1, wherein at least one of either said first electrode or said second electrode contain multiple hole.

5. A hydrogen-oxygen gas generating method according to claim 1, wherein said sealing means has a flexible member installed between an inner edge of an opening and said vibrating rod.

* * * * *